US011472661B2

(12) United States Patent
Gonsalves

(10) Patent No.: US 11,472,661 B2
(45) Date of Patent: Oct. 18, 2022

(54) DEVICE TO AUTOMATE AND SEMIAUTOMATE A FISH TAPE

(71) Applicant: James C. Gonsalves, Honolulu, HI (US)

(72) Inventor: James C. Gonsalves, Honolulu, HI (US)

(*) Notice: Subject to any disclaimer, the term of this patent is extended or adjusted under 35 U.S.C. 154(b) by 498 days.

(21) Appl. No.: 16/359,462

(22) Filed: Mar. 20, 2019

(65) Prior Publication Data

US 2019/0292009 A1  Sep. 26, 2019

Related U.S. Application Data

(60) Provisional application No. 62/645,543, filed on Mar. 20, 2018.

(51) Int. Cl.
*B65H 75/48* (2006.01)
*B65H 75/44* (2006.01)
*H02G 1/08* (2006.01)

(52) U.S. Cl.
CPC ......... *B65H 75/48* (2013.01); *B65H 75/4486* (2013.01); *B65H 75/4494* (2013.01); *H02G 1/081* (2013.01); *H02G 1/083* (2013.01); *H02G 1/085* (2013.01); *B65H 2701/376* (2013.01)

(58) Field of Classification Search
CPC .. B65H 75/406; B65H 75/48; B65H 75/4494; B65H 75/4486; B65H 2701/376; H02G 1/083; H02G 1/085; H02G 1/081
See application file for complete search history.

(56) References Cited

U.S. PATENT DOCUMENTS

| 4,413,808 | A | 11/1983 | Finkle |
| 4,917,362 | A | 4/1990 | Wilson |
| D408,749 | S | 4/1999 | Walsten |
| 6,513,791 | B1* | 2/2003 | Yates .................... B65H 75/406 242/390.8 |
| 6,722,603 | B1 | 4/2004 | Atencio |
| 8,496,229 | B1* | 7/2013 | Mayhall ............... B65H 75/406 254/134.3 FT |
| 8,695,944 | B2 | 4/2014 | Riggins |
| 2016/0096705 | A1* | 4/2016 | Ryals ................... B65H 75/406 403/164 |

* cited by examiner

*Primary Examiner* — Seahee Hong
(74) *Attorney, Agent, or Firm* — Antonio Papageorgiou, Esq; Lombard Geliebter LLP

(57) ABSTRACT

A device to automate or semiautomate a fish tape is provided that can include an attachable handle with battery operated motor, rollers, gears and controls that can be integrated into its own or existing fish tape spools. Another embodiment provides a left and right plate and an assembly about a member to be driven by a crank or other automated means to mobilize a fish tape which over comes the limitations of existing manual and automatic fish tapes making it safer, more efficient and easier for an operator to pull wire.

10 Claims, 25 Drawing Sheets

DEVICE TO AUTOMATE AND SEMIAUTOMATE A FISH TAPE

RELATED APPLICATION

This application claims the benefit of U.S. (Provisional) Application No. 62/645,543, filed on Mar. 20, 2018, which is hereby incorporated herein by reference.

BACKGROUND OF THE INVENTION

The present invention relates to fish tapes in particular to fish tapes designed for pulling wire through distances of conduit or other enclosed spaces.

Fish tapes have been know for many years and are available in many designs, both manual and automated. Primarily fish tapes are made of a narrow band of spring steel that is coiled into a case for storage and transportation. By careful manipulation the tape can be unwound and guided through conduit and other confined spaces. The tape is then connected to a wire or wires and rewound to pull the wire or wires through the conduit or confined space. Pulling wire can be quit a task, especially if the conduit is long or has several bends in it.

Manual wire pulling is accomplished by an operator typically rotating a fish tape case in a counter clockwise direction. This is often times awkward and takes a great deal of strength and dexterity. Manual wire pulling is a very fatiguing endeavor. Wire pulling done day after day subjects an operator to possible work related injury.

Automatic wire pulling more typically employs the use of electricity, air pressure, motors and gears to deploy and rewind a fish tape. In most instances automation is used for commercial and industrial applications of pulling wire. In these instances budgets are higher and competition to preform this type of work is less. Automatic wire pulling equipment is often times specialized and expensive.

Low cost automated fish tapes that could be used in the domestic construction market where there is more competition and consciousness about competitive and affordable solutions. Just are not available for purchase in today's market.

Accordingly there is a need for a device to automate or semiautomate a fish tape which over comes the limitations of existing manual and automatic fish tapes available in today's market and making it safer, more efficient and easier for an operator to pull wire.

SUMMARY OF THE INVENTION

A device for automating operation of a fish tape assembly having a case movable relative to a handle thereof for extracting a tape located within the housing of the fish tape assembly, the device including: a left plate; a right plate, the left and right plates attachable to each other with the tape assembly case placed there between on opposite sides of the case, at least one of the left and right plates comprising a member fixed thereto configured to be coupled to a power means or hand crank; a plurality of tracks attached to at least one of the left and right plates; and a plurality of centering slides, the plurality of tracks slidingly adjustable relative to the plurality of tracks for affixing the device to the fish tape assembly.

In one embodiment, the plurality of tracks and centering slides operable to center the device in an opening in the case of the fish tape assembly.

In one embodiment, the device includes at least four tracks and at least four centering slides, each of the centering slides adjustable on one of the tracks.

In one embodiment, the tracks and centering slides spaced from each other at an about 90 degree angle.

In one embodiment, the left and right plates fix the device to the case of the fish tape assembly.

In one embodiment, the rotating the device with the member causes the case of the fish tape assembly to rotate relative to the handle of the fish tape assembly.

In one embodiment, the device includes a motor operable to rotate the device relative to the handle of the fish tape assembly.

In one embodiment, the motor is variably operable for adjusting the speed thereof.

Additional aspects of the present invention will be apparent in view of the description which follows.

BRIEF DESCRIPTION OF THE FIGURES

FIG. 9 is a left side elevation view like FIG. 6 with the left plate removed disclosing another embodiment of a right plate and a left plate can be similar.

DETAILED DESCRIPTION OF THE INVENTION

Figure 1:
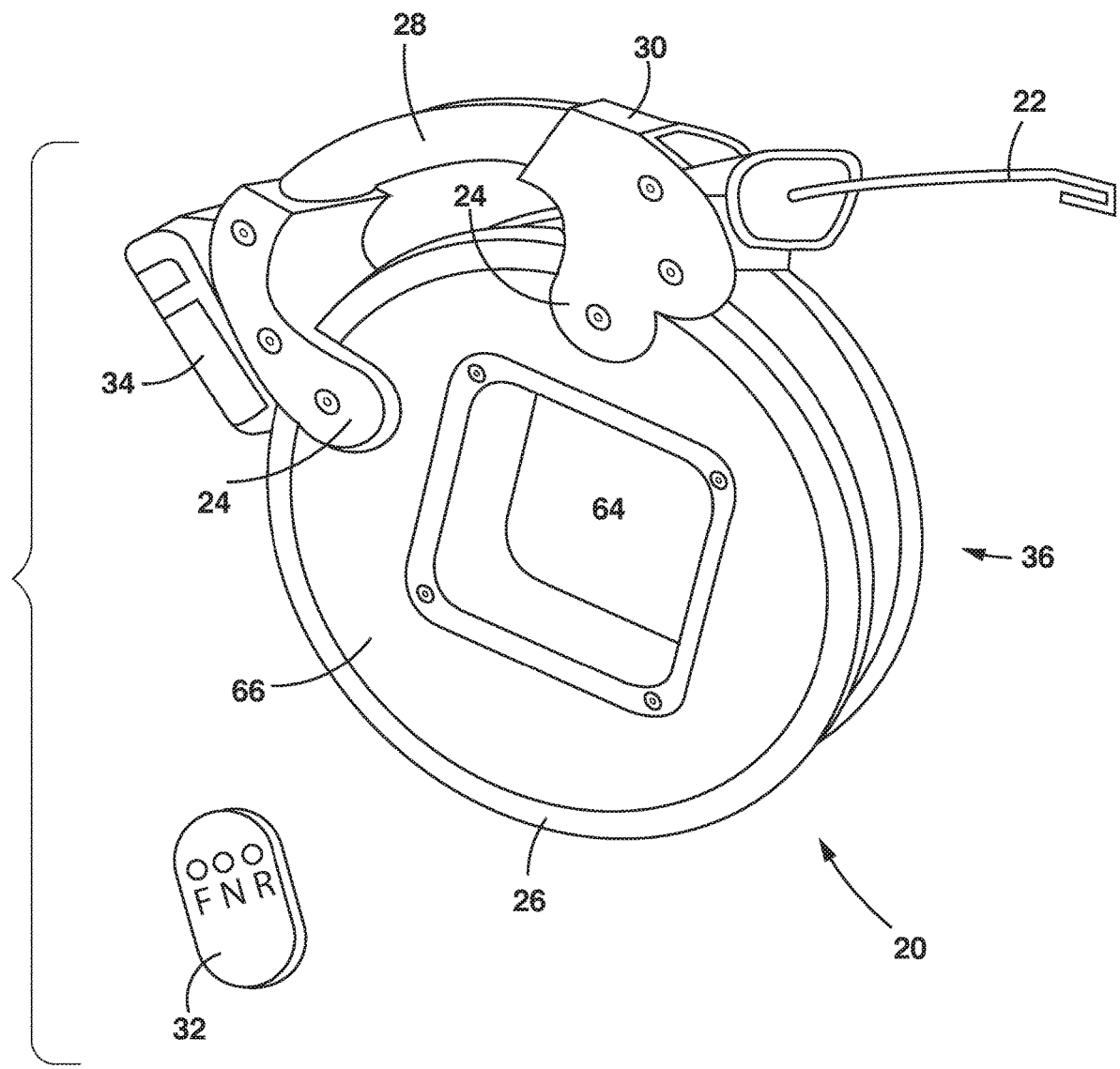
FIG. 1 is a perspective view of a device to automate or semiautomate a fish tape.

Referring to FIG. 1, a perspective view of a device to automate or semiautomate a fish tape 20 according to one embodiment is shown. In one embodiment, the device includes an 18 to 24-volt rechargeable battery pack 34 operable with replacement attachment handle 28 that replaces the handle of most commonly used fish tape 36 spools 26. The primary function of the replacement handle is to remove the standard use of manually dispensing and retracting the steel and fiberglass fish tapes 22.

In one embodiment, the automated aspects of the device may be achieved with an automatic power means 38 of which the core components of the invention are as follows: an integrated handle 28 composed of a durable plastic material that can be transferred onto new or existing conventional fish tape 36 spools 26; a battery operated motor within the handle 28 to power gears and attachment rollers that rotate the spool 26 therewith causing the tape to be pushed out of and into the spool 26; controls 30 comprised of a variable speed trigger with forward, reverse and neutral settings that control dispensing and retracting of the tape 36; and a 9 or other volt battery remote control 32 switch for controlling the motor for one man operation for certain job applications.

The main benefit of the device is to put an end to strained arms, shoulders and any other physical hardships involved while dispensing and retracting the conventional fish tape 36. The benefit thus creates a more productive work environment. The device will help to keep wire pulling less physically stressful, eliminate wasted down time and help keep the operators much more motivated which in the end result leads to more production on the job site.

In one embodiment the device handle 28 is attached to the spool 26 in a manner by loosening the already present spool 26 housing screws. Once they are loosened, the user may simply remove the factory installed handle, then slide the bottom of the replacement handle 28 onto the case or housing 66. Once the replacement handle 28 is securely in place, the housing screws are retightened to affix the replacement handle onto the spool for operation as discussed herein.

Built into the handle 28 may be a variable speed trigger switch that controls four urethane rollers 24 which are securely compressed onto the housing 66 with a tension knob. The purpose of this tension knob is to make sure that all the rollers 24 are compressed or squeezed onto the housing on a consistent basis so that there are no interruptions during use of the device to automate or semiautomate a fish tape's 20 functioning that may be caused by slipping. To give a visual perspective of the device, it is much like a battery operated drill with which you simply apply the desired direction forward or reverse, squeeze the trigger, and in which time the motor and integrated gears activate these four rollers caused the housing 66 to move relative to the tape to therewith dispense or retract the fish tape from the spool into a desired motion. In relation to the directional setting, there may be a neutral gear to make sure the task at hand never gets put on hold because of a weak or dead battery which will ultimately lead to delays. Switching the device to neutral basically puts it into a manual mode for the user to manually move the case 66 relative to the replacement handle 28. Once the rollers are engaged, a digital distance meter may track the progress of the tape to allow the user to measure exactly how far along he or she is with the wire pulling. This feature may also be very helpful for prefabbing custom cut wire runs as to eliminate the need and use of a tape rule.

A limit switch may also be implemented to make sure the device automatically shuts down once the device to automate or semiautomate a fish tape 20 when it reaches it's maximum distance programmed into the device to prevent motor or roller damage. As an added feature the user may be allowed to employ a hand-held remote control 32 to operate the device just in case another worker is not readily available to assist with the wire pulling. Many times the device will need for two people to pull wire.

The remote control 32 may be labeled with; on, off, high, medium and low for speed control. The remote control 32 preferably works off a 9-volt battery. The user can preferably designate a frequency for your remote control 32, with dip switch settings composed of four numbers labeled 1 through 4. This ensures that the users don't accidentally trigger additional devices that may be located close to each other. Having the device controlled by this remote control 32 gives the worker the benefit of a helping hand so to say. This results in lower labor costs thus giving the employer a huge advantage when bidding on job contracts.

In other embodiments of the device to automate or semiautomate a fish tape 20 it will be appreciated by one skilled in the art that various changes in form and detail can be made without departing from the true scope of the invention. Such as various configurations of gears, rollers, power means, mechanical configurations, materials and other means of construction, manufacture and assembly.

Figure 2:
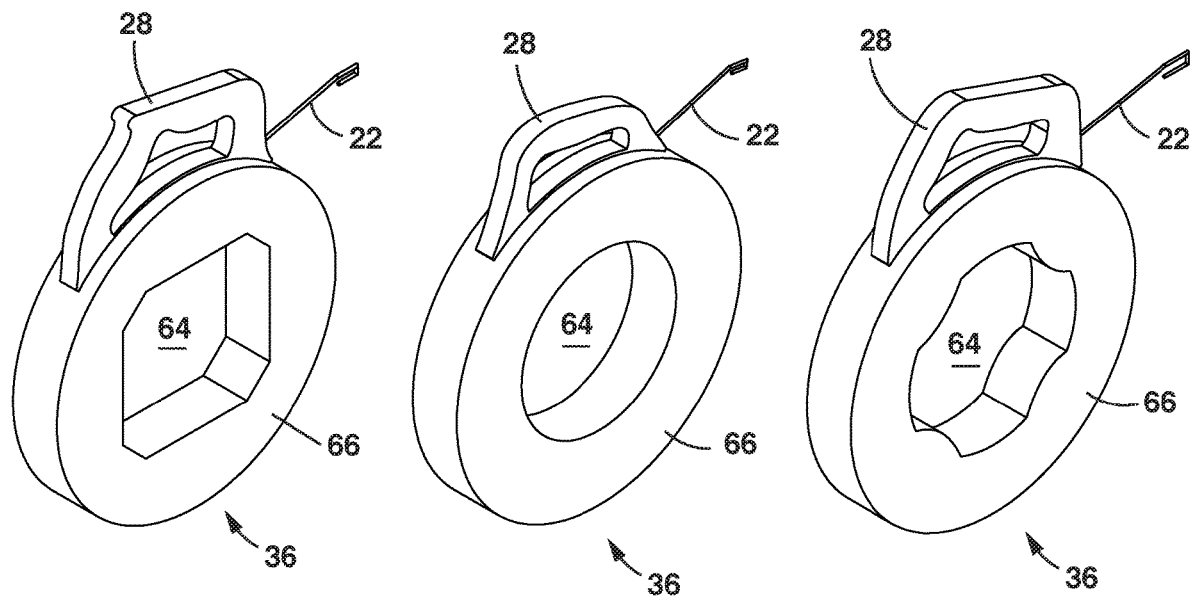
FIG. 2 is a perspective view of typical manual fish tapes available in today's market.
Figure 3:
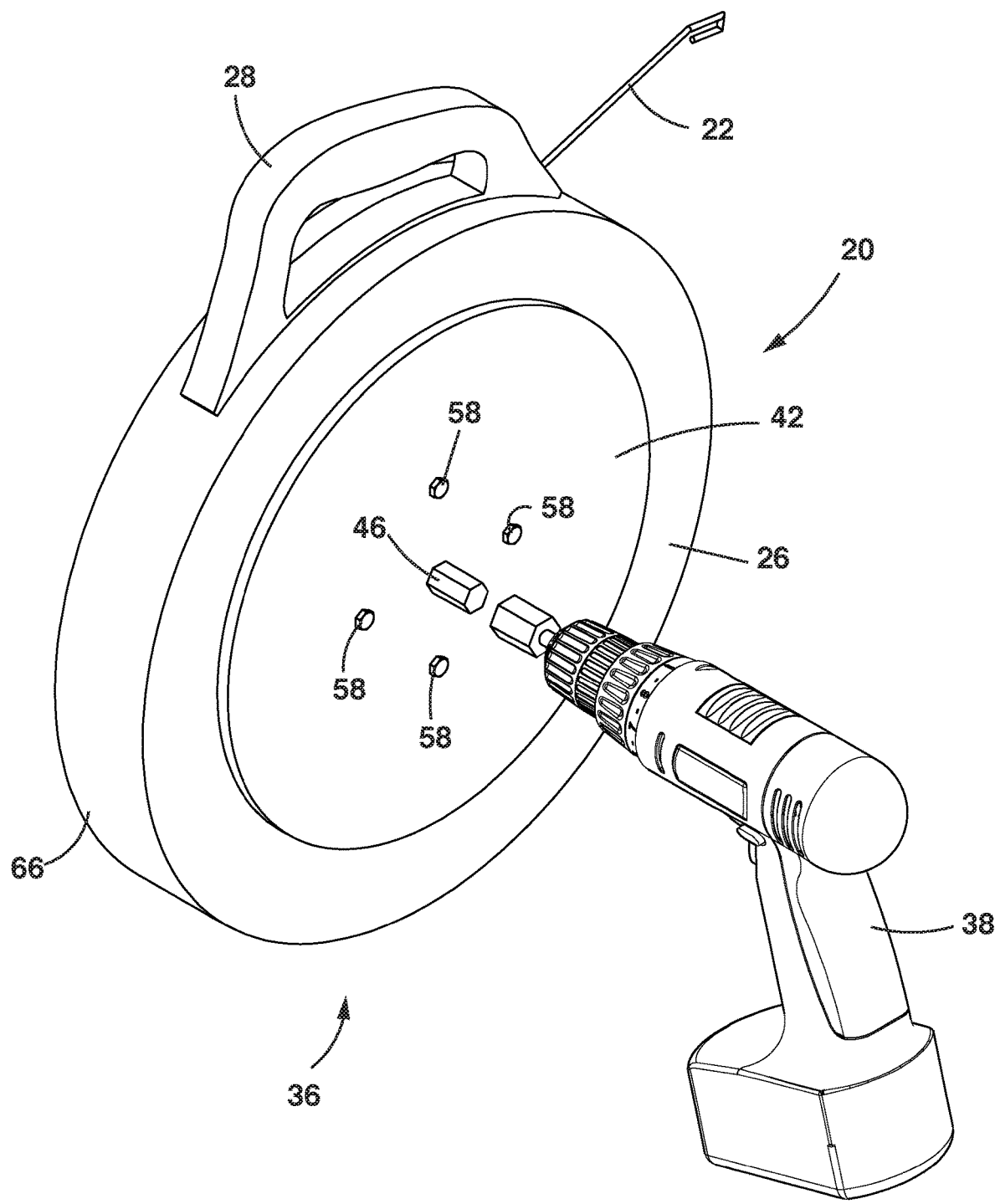
FIG. 3 is a perspective view taken from the left side and back of a second embodiment of a device to automate or semiautomate a fish tape by an automatic power means.
Figure 4:
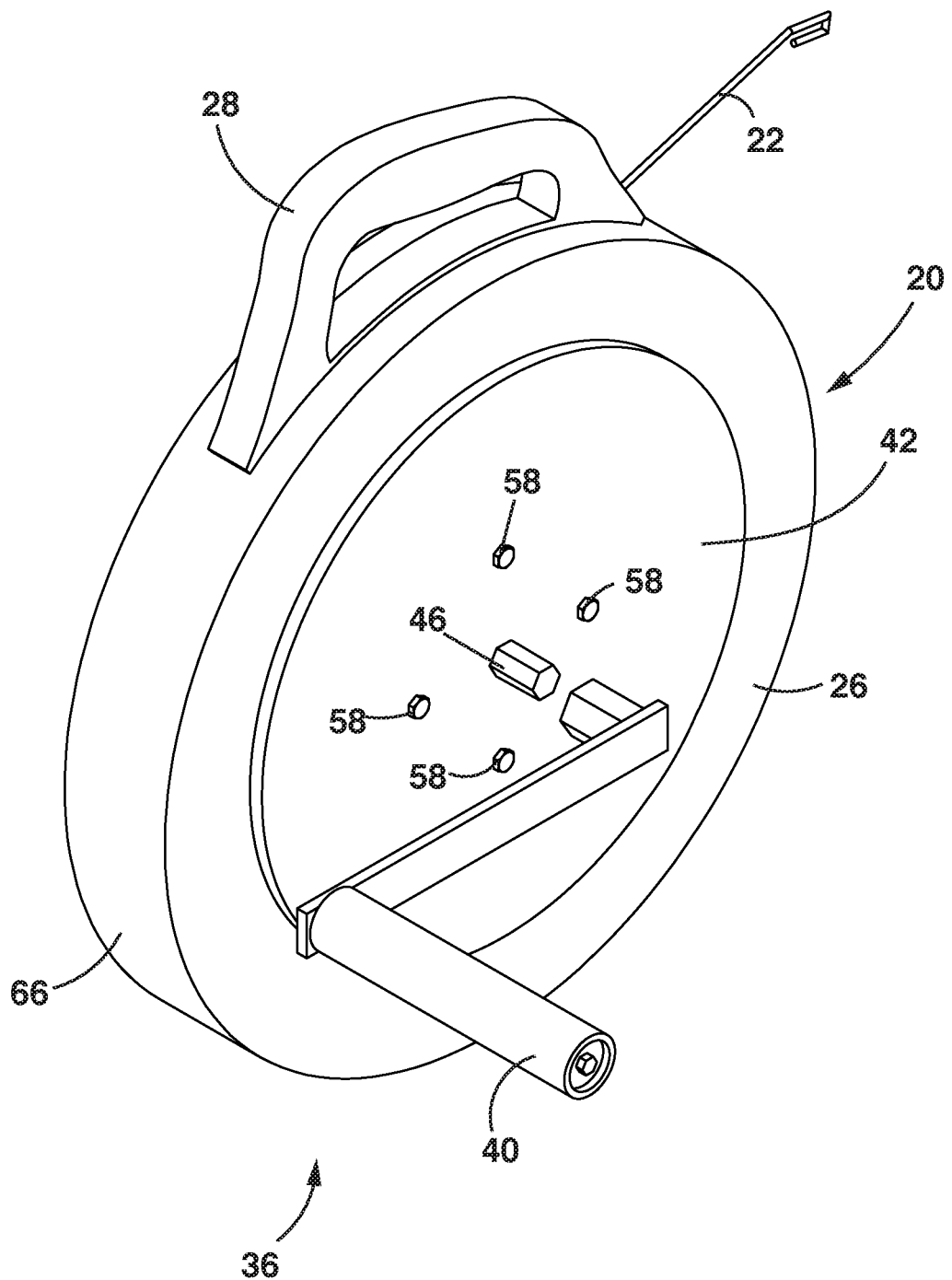
FIG. 4 is a perspective view of a second embodiment of a device to automate or semiautomate a fish tape by a crank.
Figure 5:
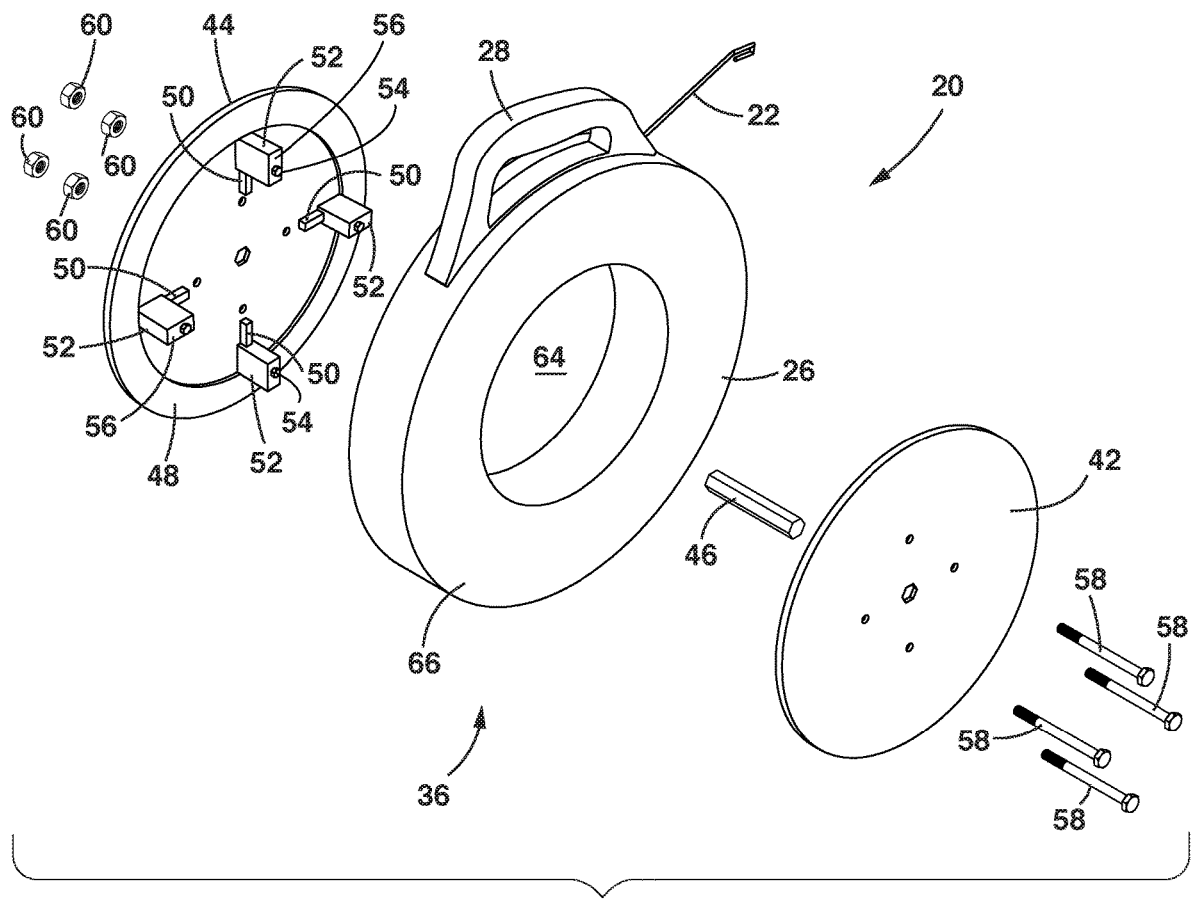
FIG. 5 is an exploded view of a second embodiment of a device to automate or semiautomate a fish tape.
Figure 6:
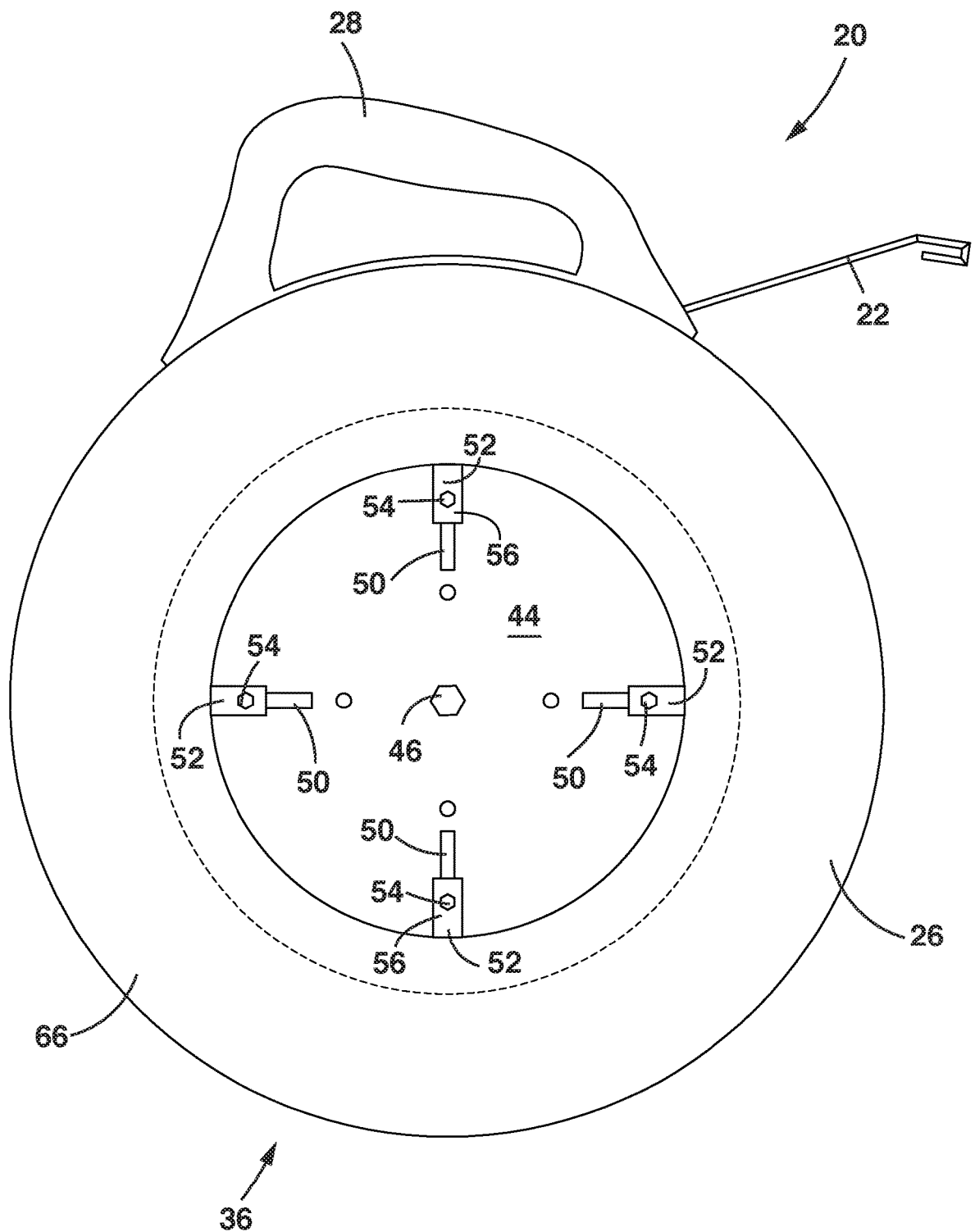
FIG. 6 is a left side elevation view of FIG. 5 with the left plate removed.
Figure 7:
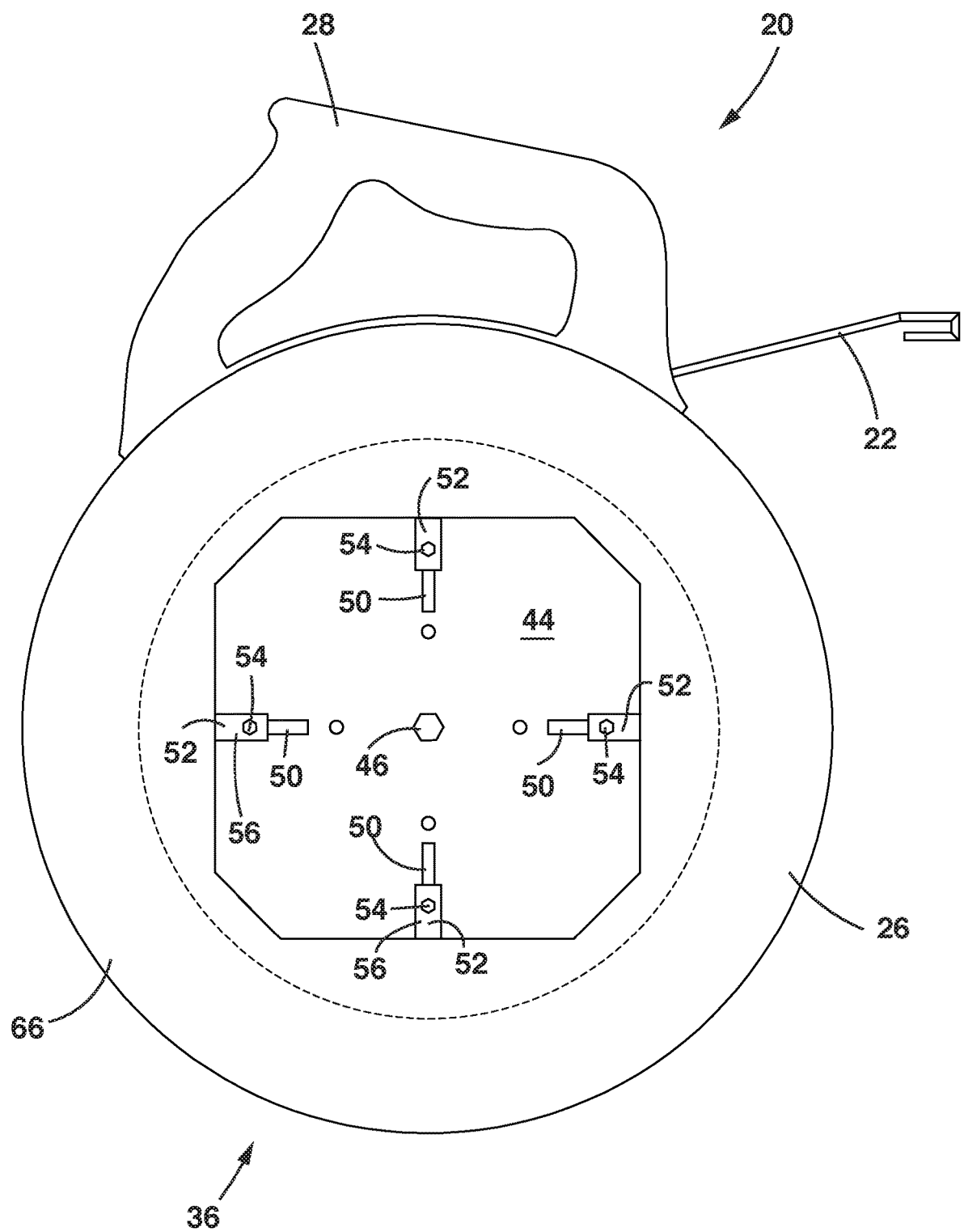
FIG. 7 is a left side elevation view like FIG. 6 with the left plate removed.
Figure 8:
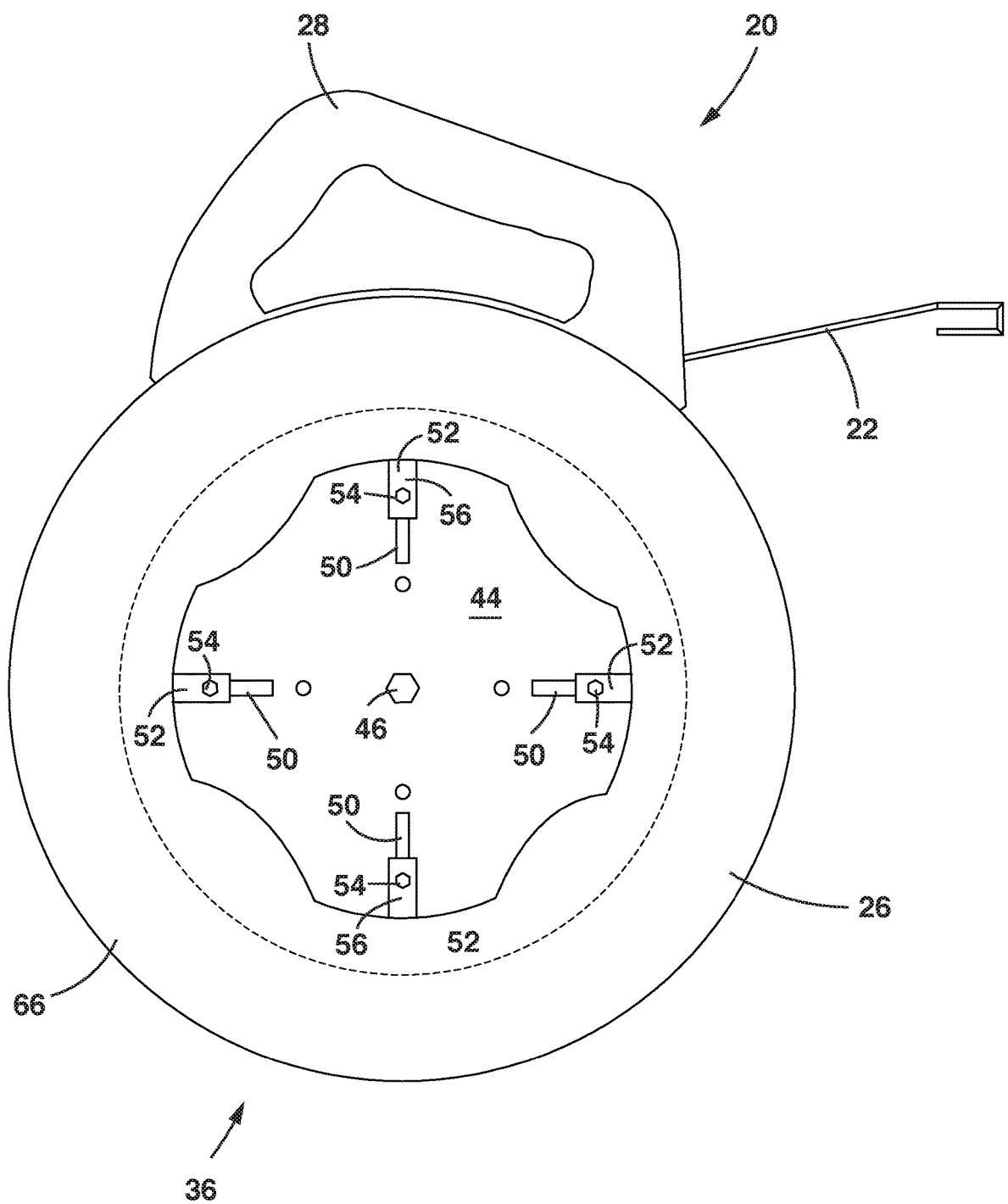
FIG. 8 is a left side elevation view like FIG. 6 with the left plate removed.
Figure 9:
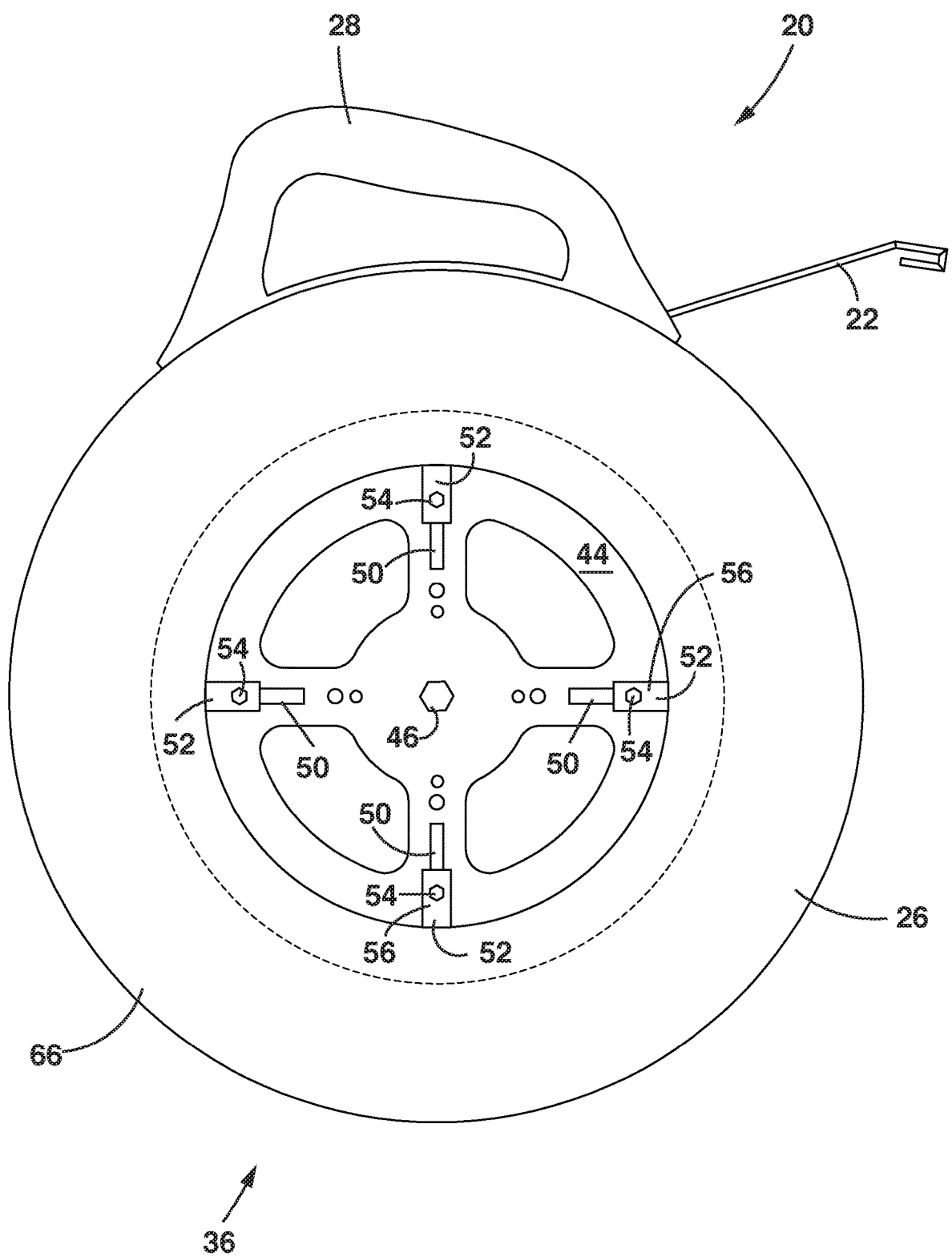
Figure 10:
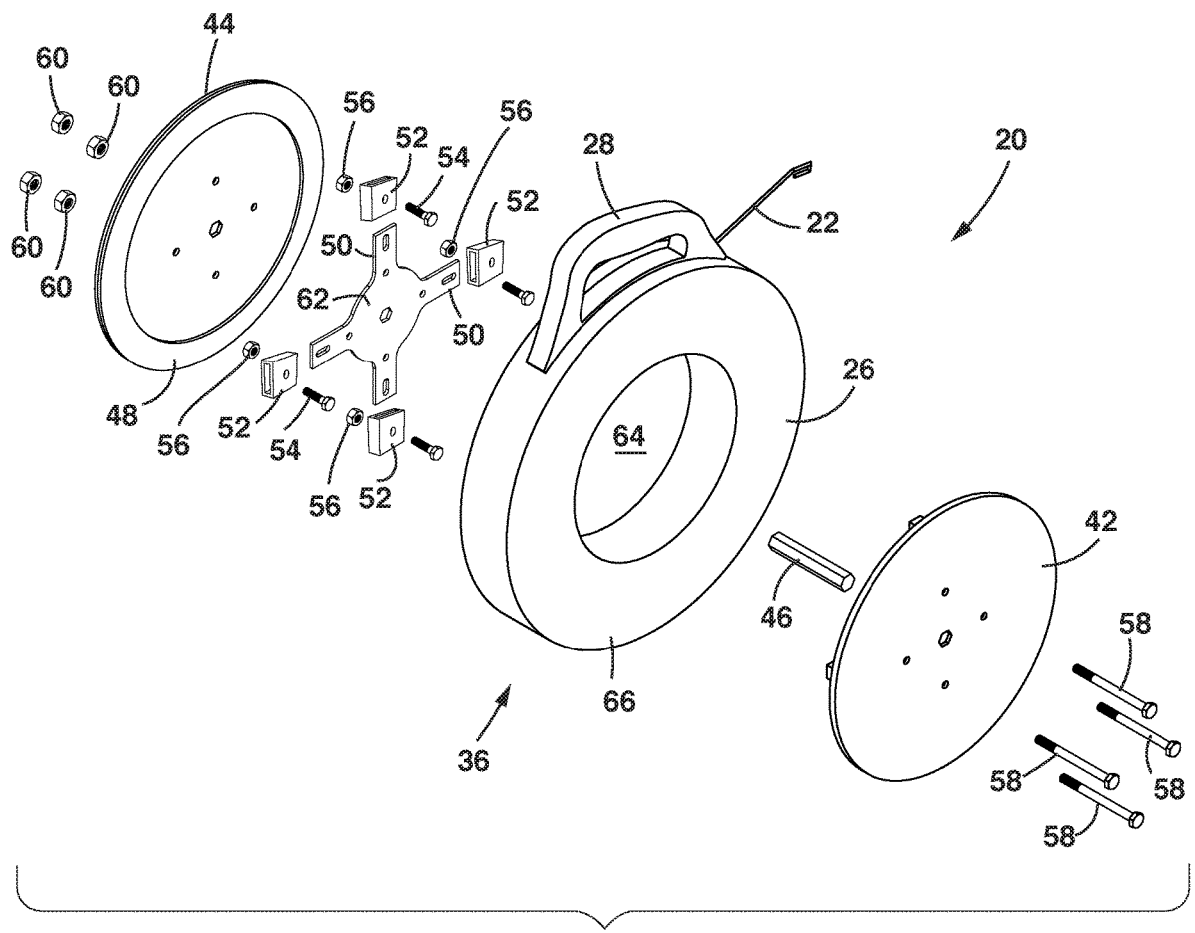
FIG. 10 is an exploded view of a third embodiment of a device to automate or semiautomate a fish tape.
Figure 11:
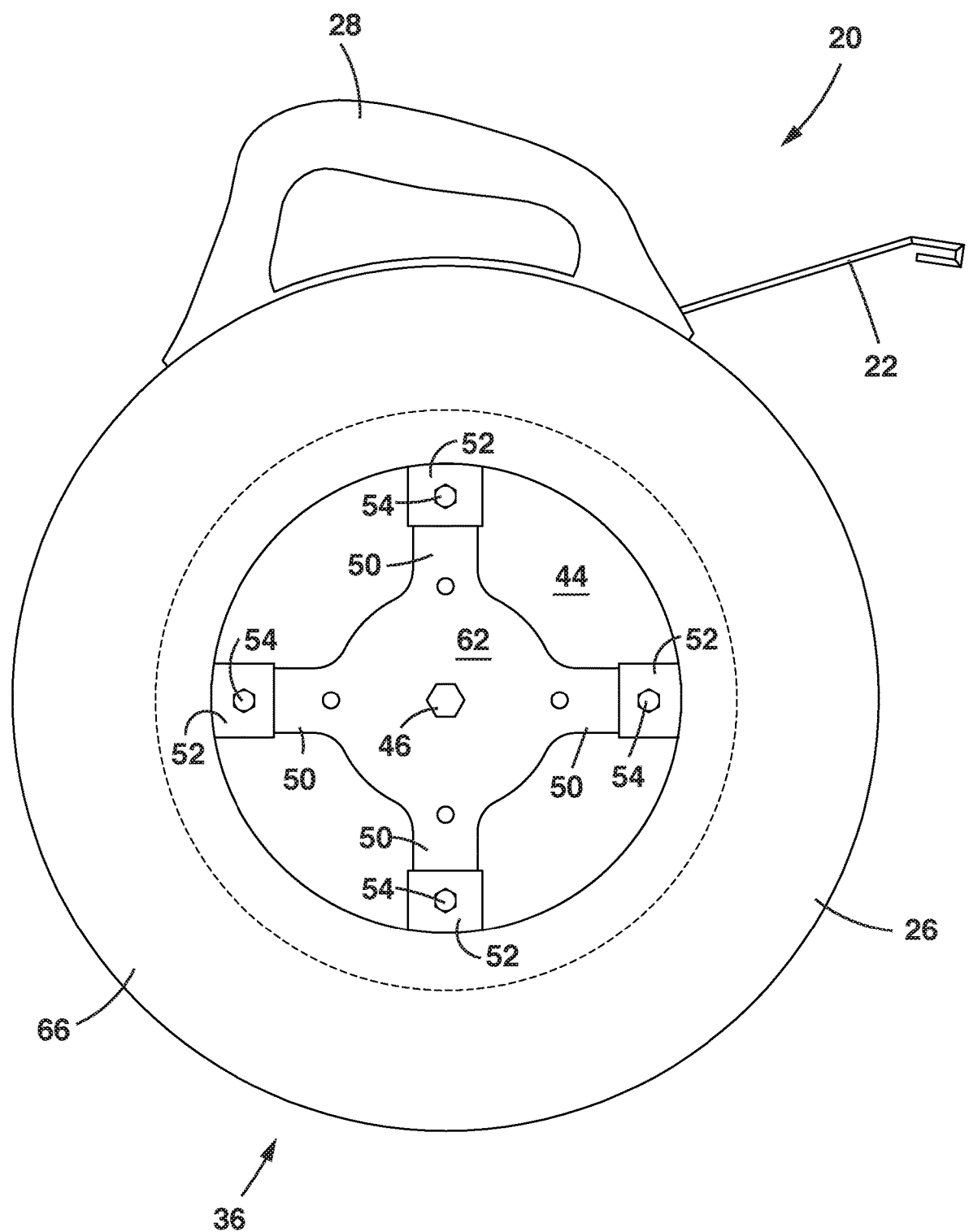
FIG. 11 is a left side elevation view of FIG. 10 with the left plate removed.
Figure 12:
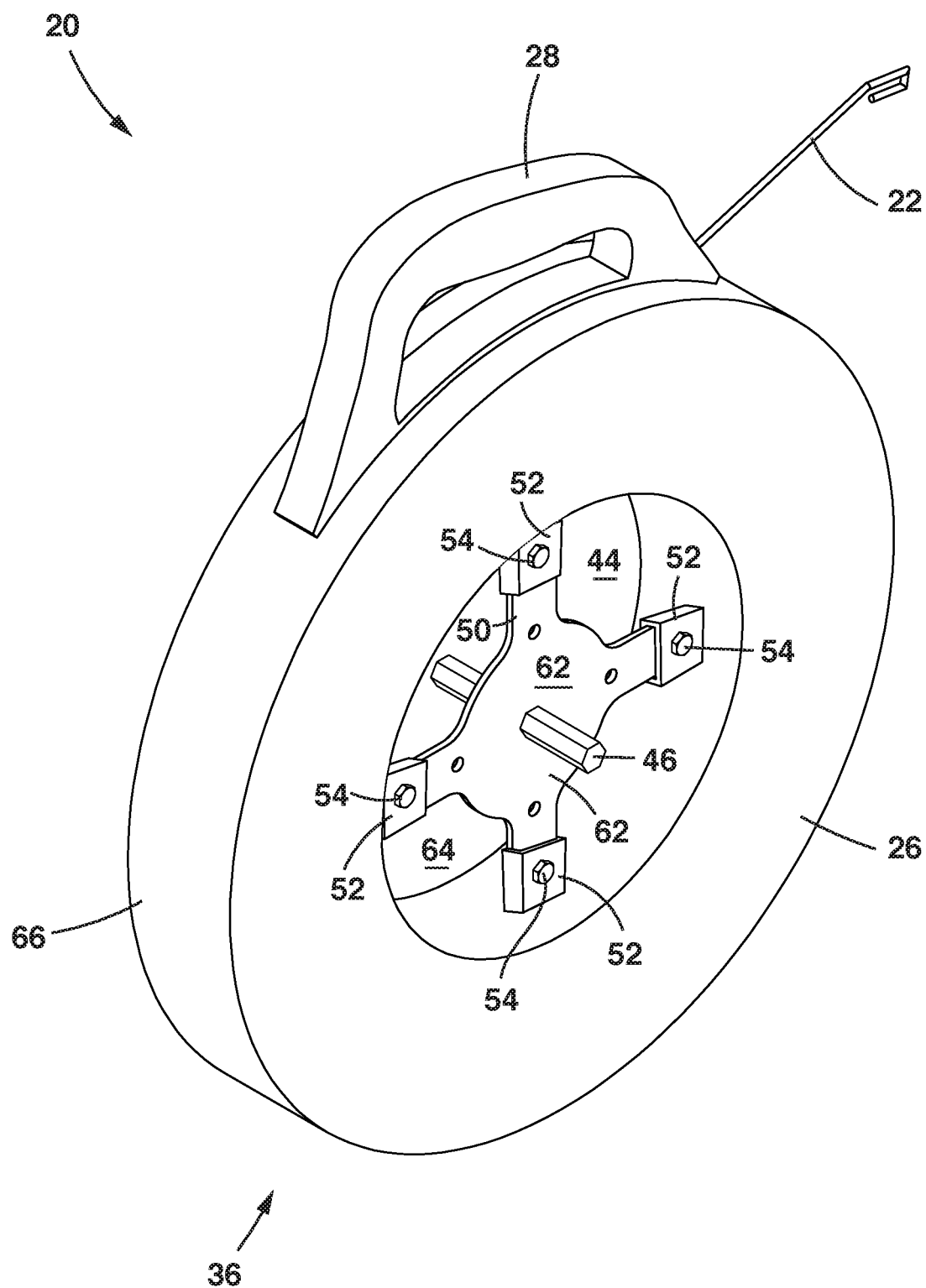
FIG. 12 is a perspective view of FIG. 11.
Figure 13:
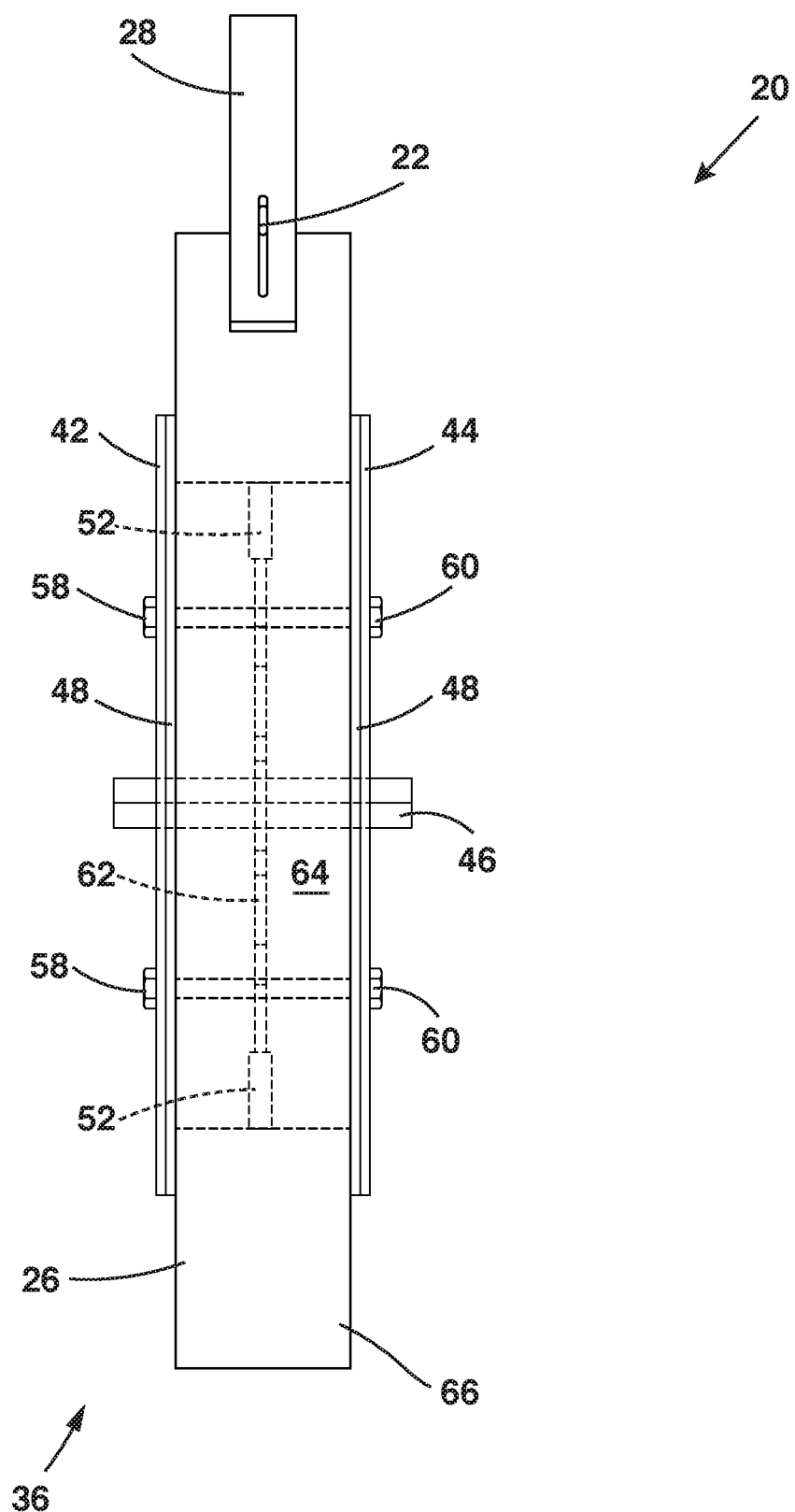
FIG. 13 is a front side elevation view of FIG. 11.
Figure 14:
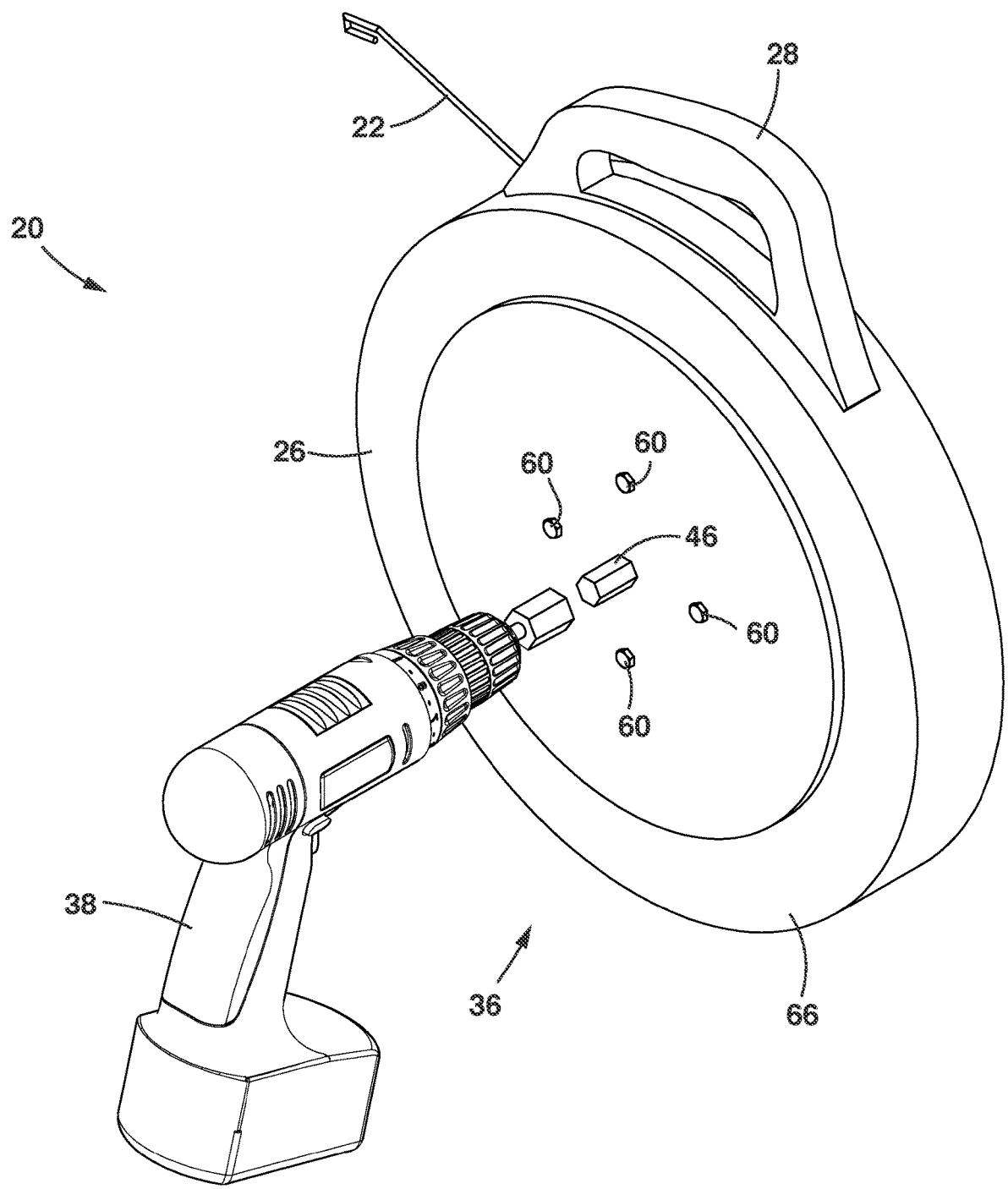
FIG. 14 is a perspective view like FIG. 3 disclosing the opposite right side.
Figure 15:
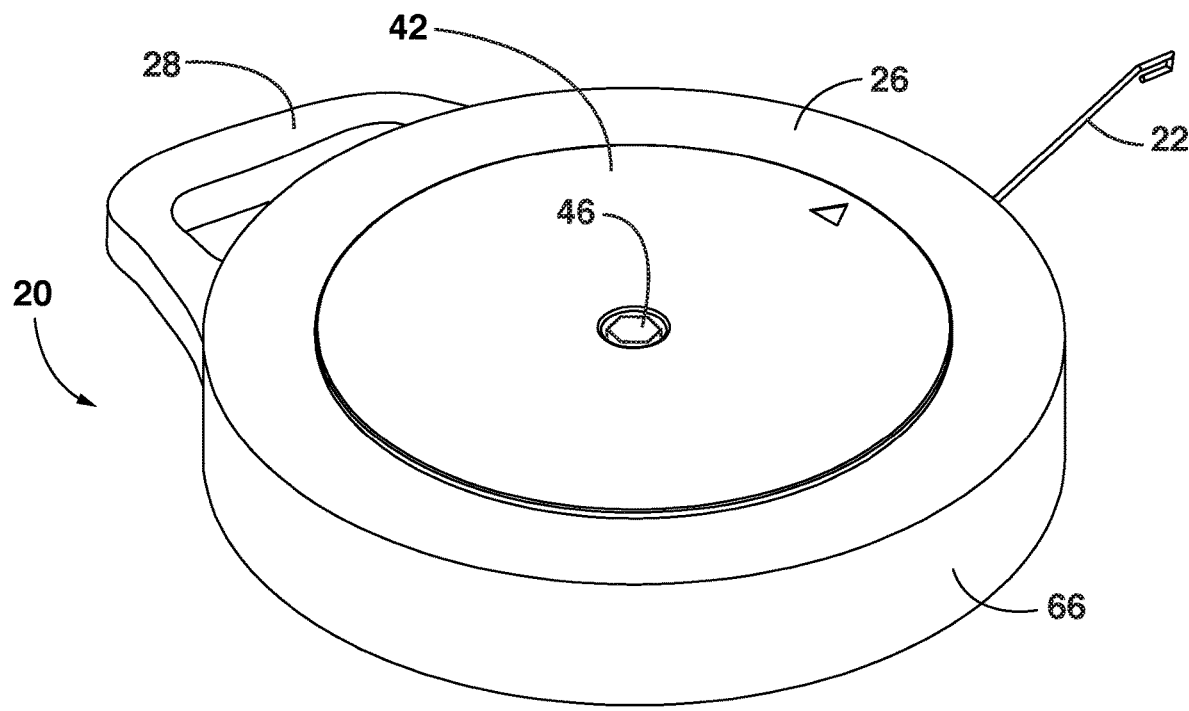
FIG. 15 is a perspective view taken predominately from the left side of a fourth embodiment of a device to automate or semiautomate a fish tape.
Figure 16:
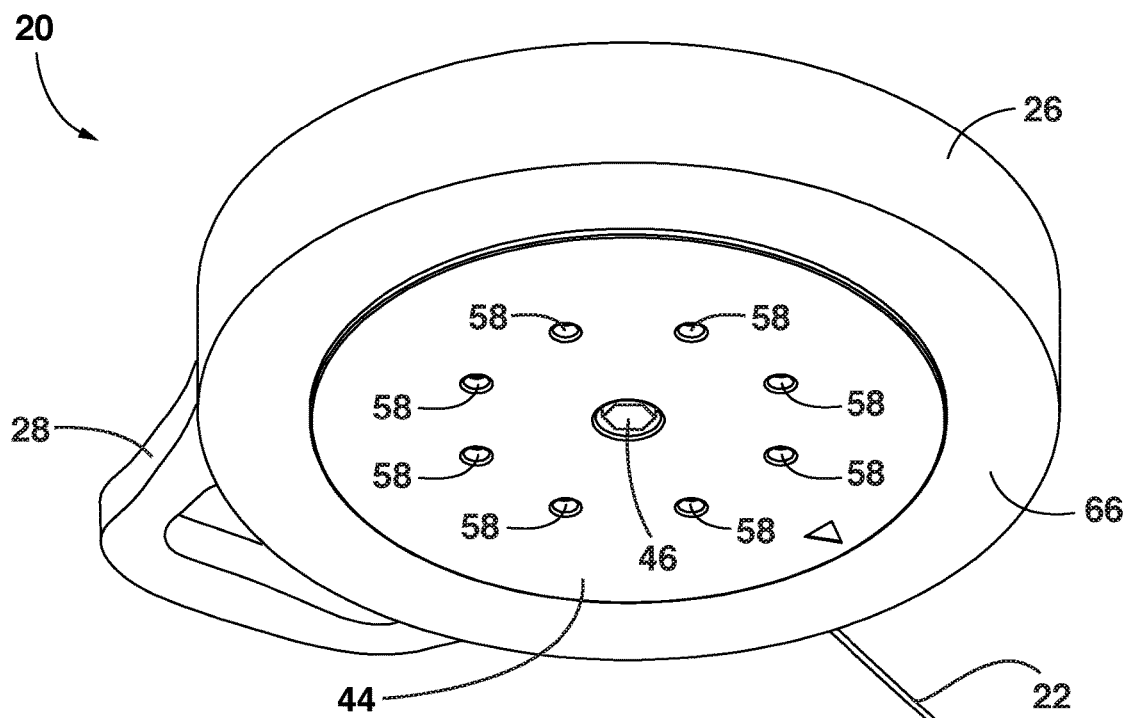
FIG. 16 is a perspective view taken predominately from the right side of a fourth embodiment of a device to automate or semiautomate a fish tape.
Figure 17:
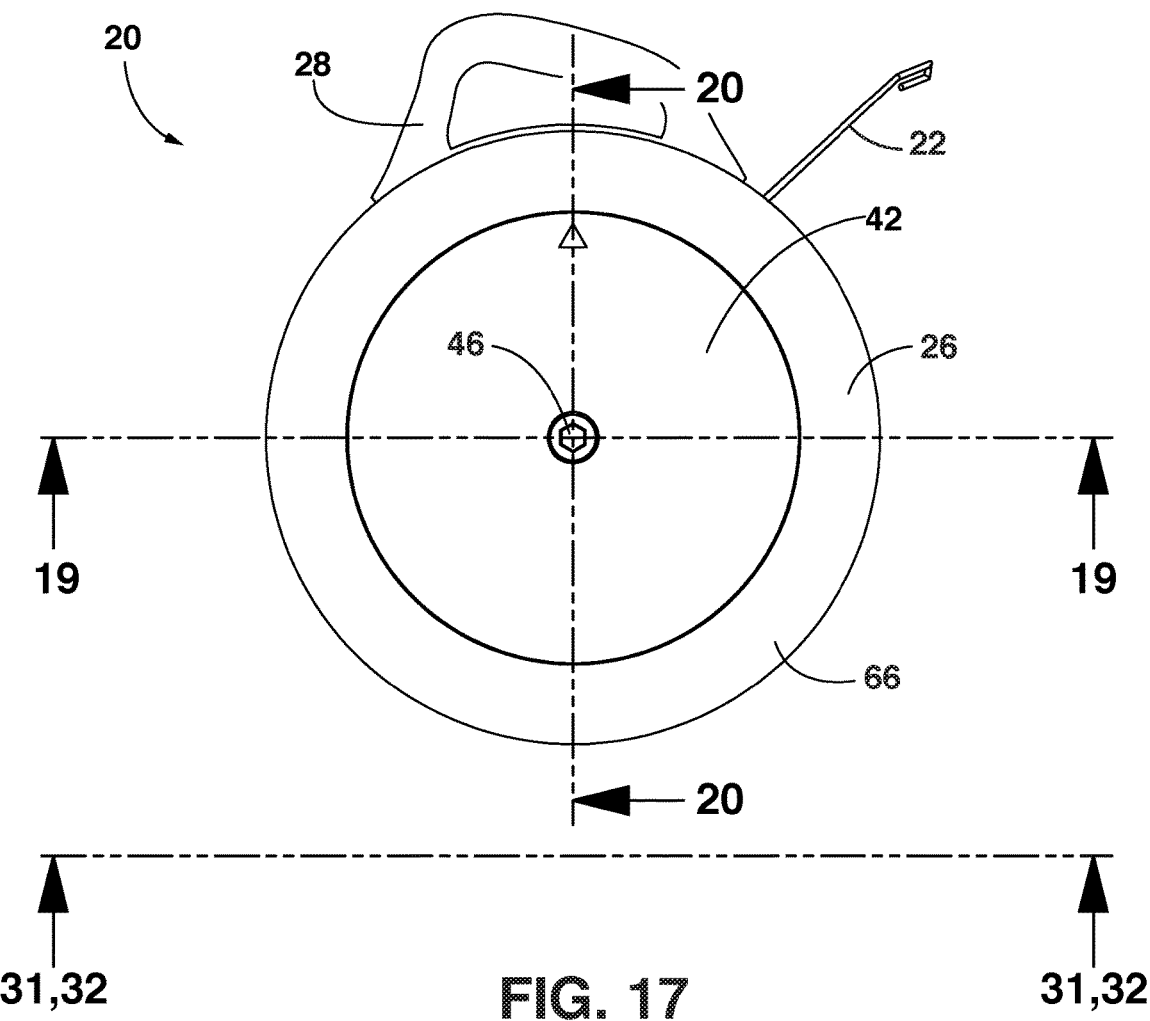
FIG. 17 is a left side elevation view of FIG. 15.
Figure 18:
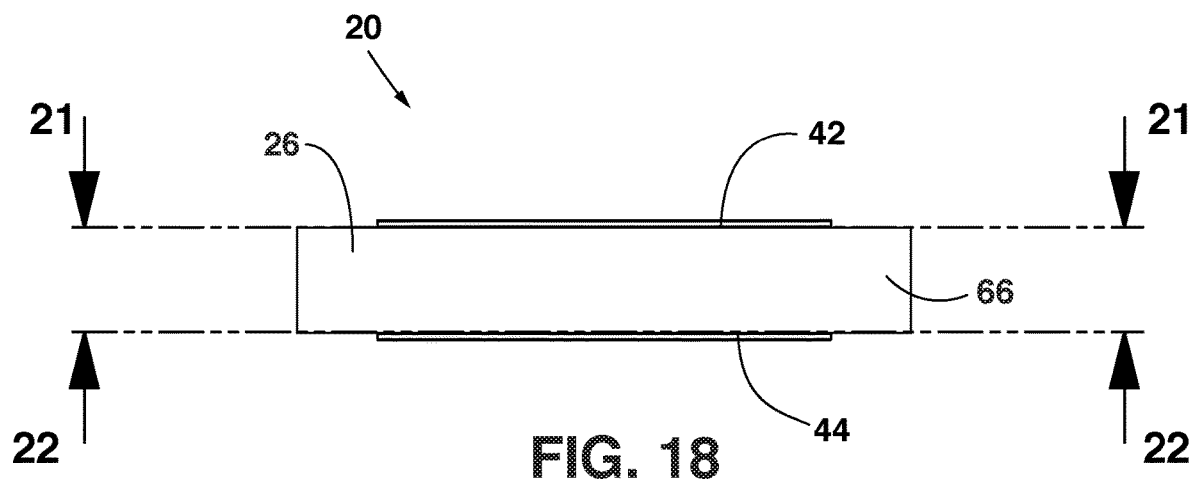
FIG. 18 is a back side elevation view of FIG. 15.
Figure 19:
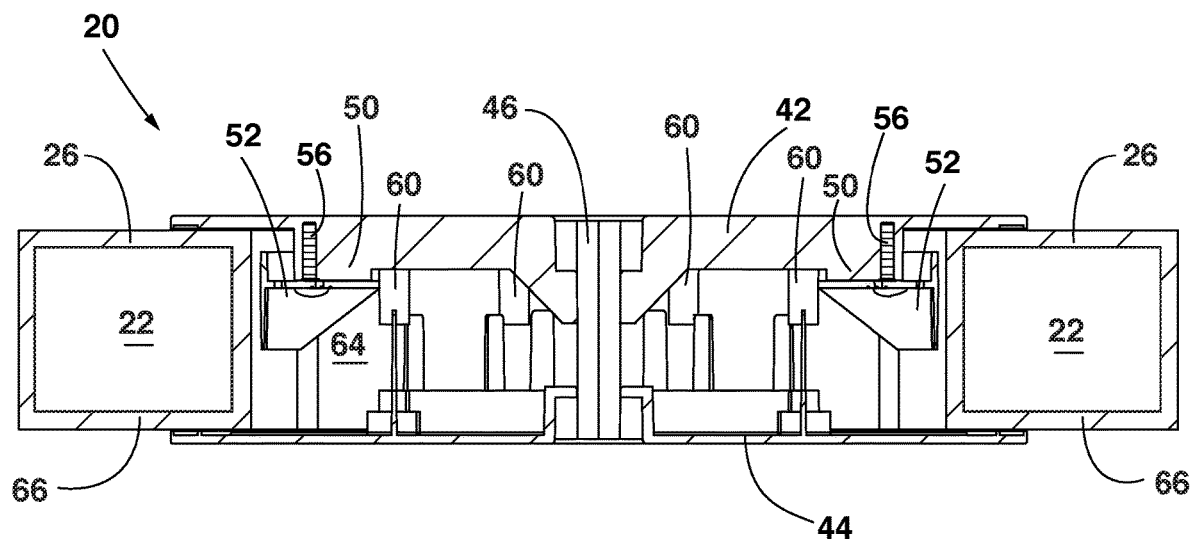
FIG. 19 is a center section view taken from FIG. 17.
Figure 20:
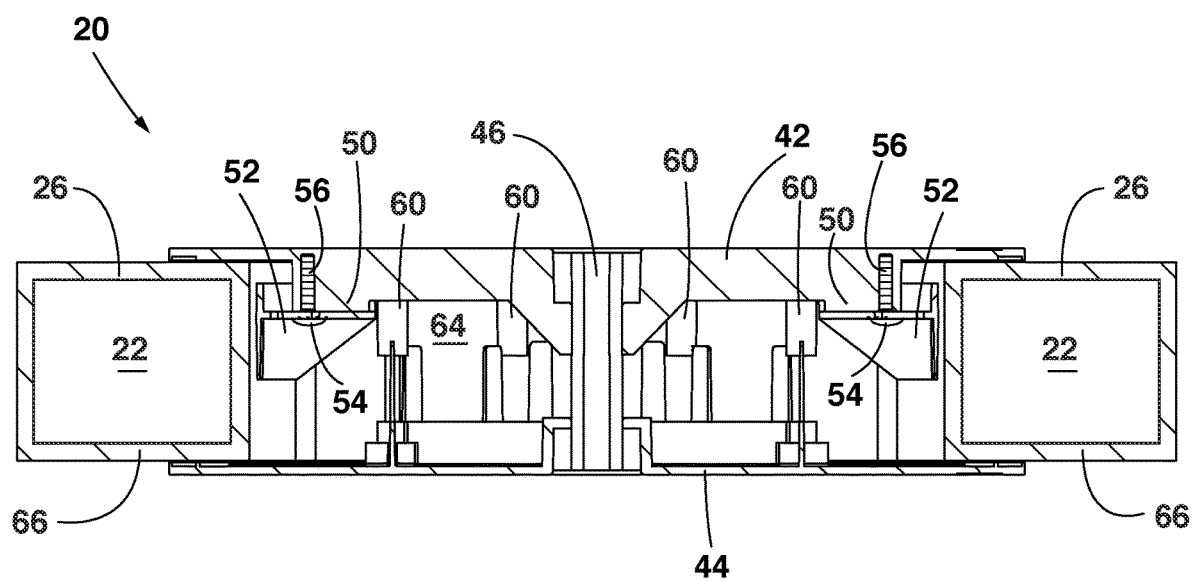
FIG. 20 is a center section view taken from FIG. 17.
Figure 21:
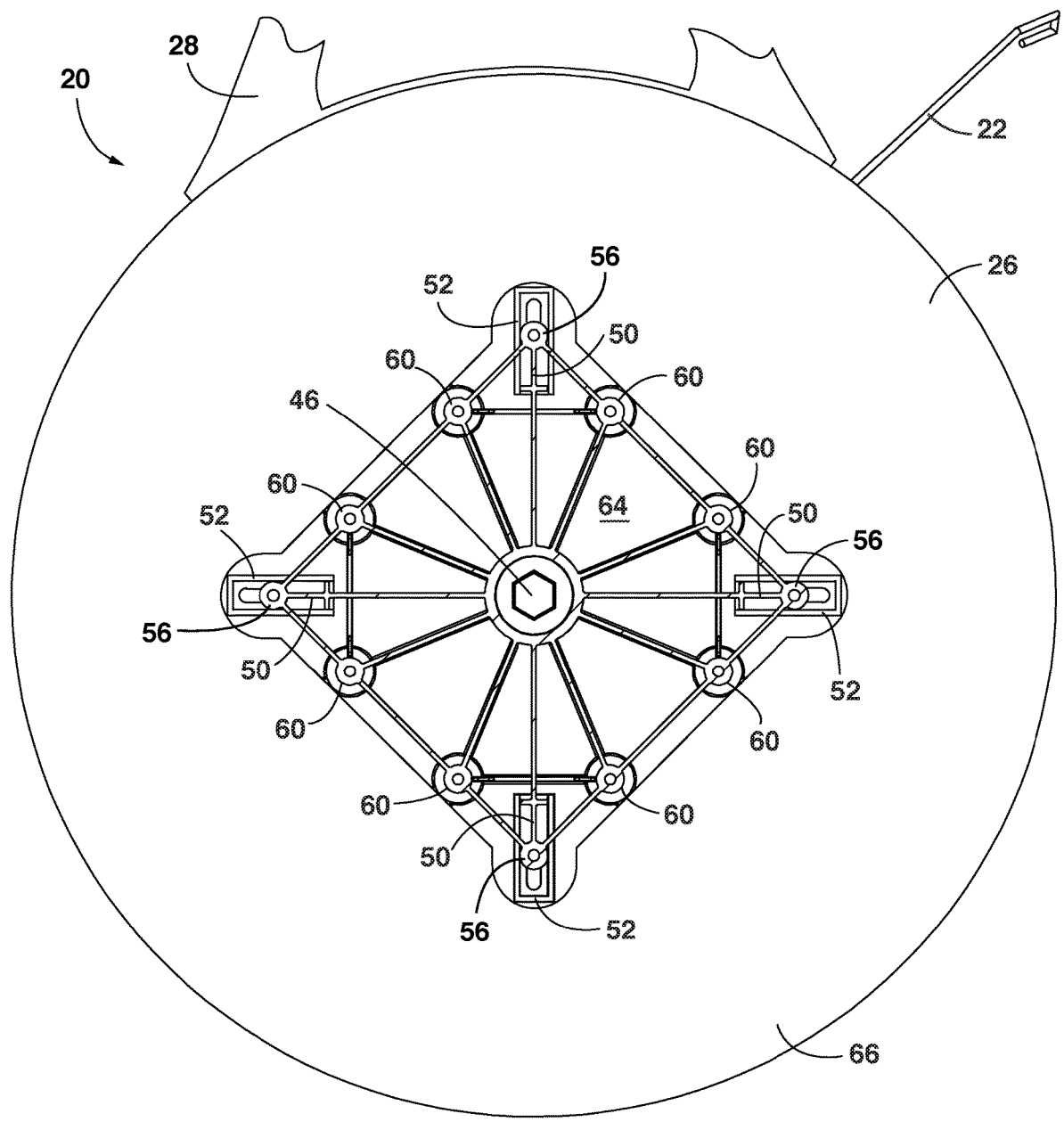
FIG. 21 is a section view taken from FIG. 18.
Figure 22:
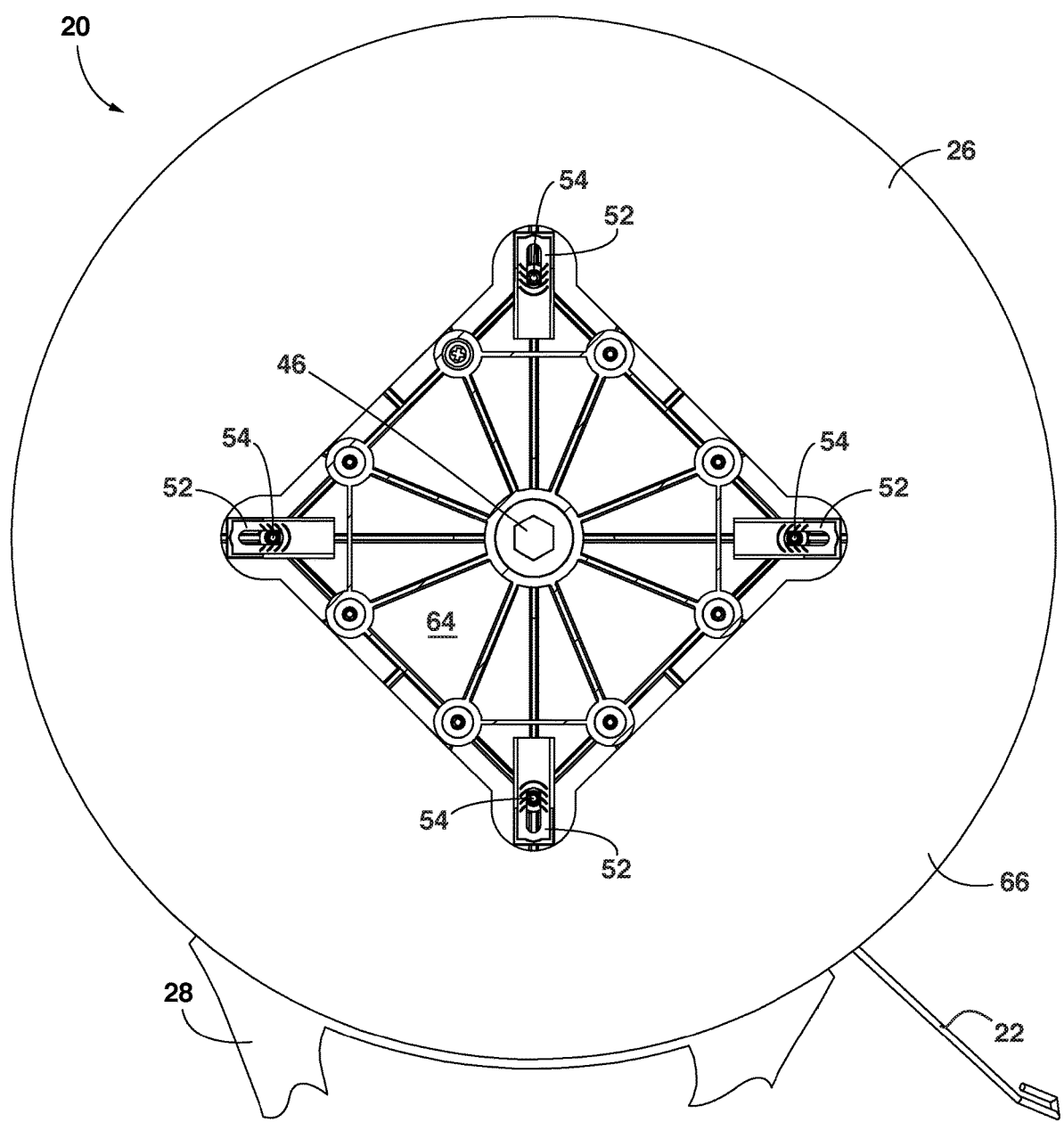
FIG. 22 is a section view taken from FIG. 18.
Figure 23:
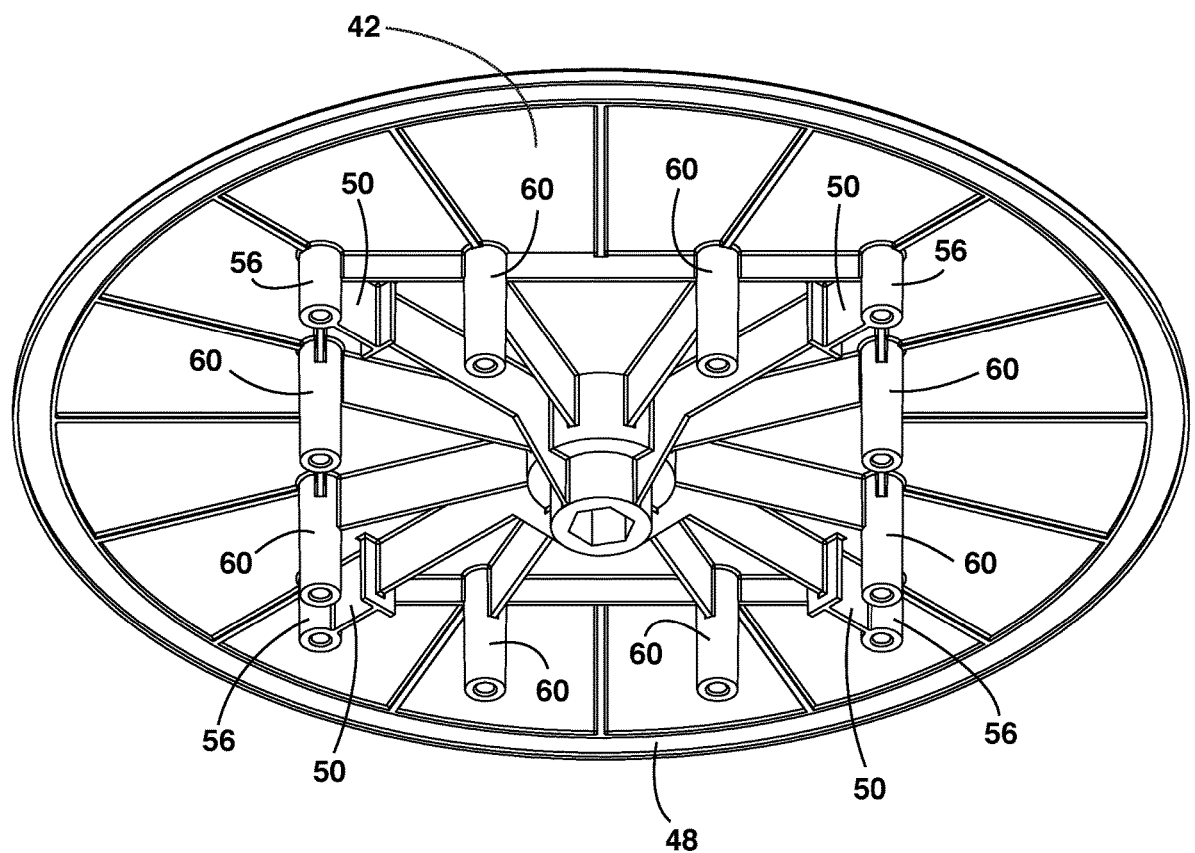
FIG. 23 is a perspective view taken predominately from the inside of a left plate.
Figure 24:
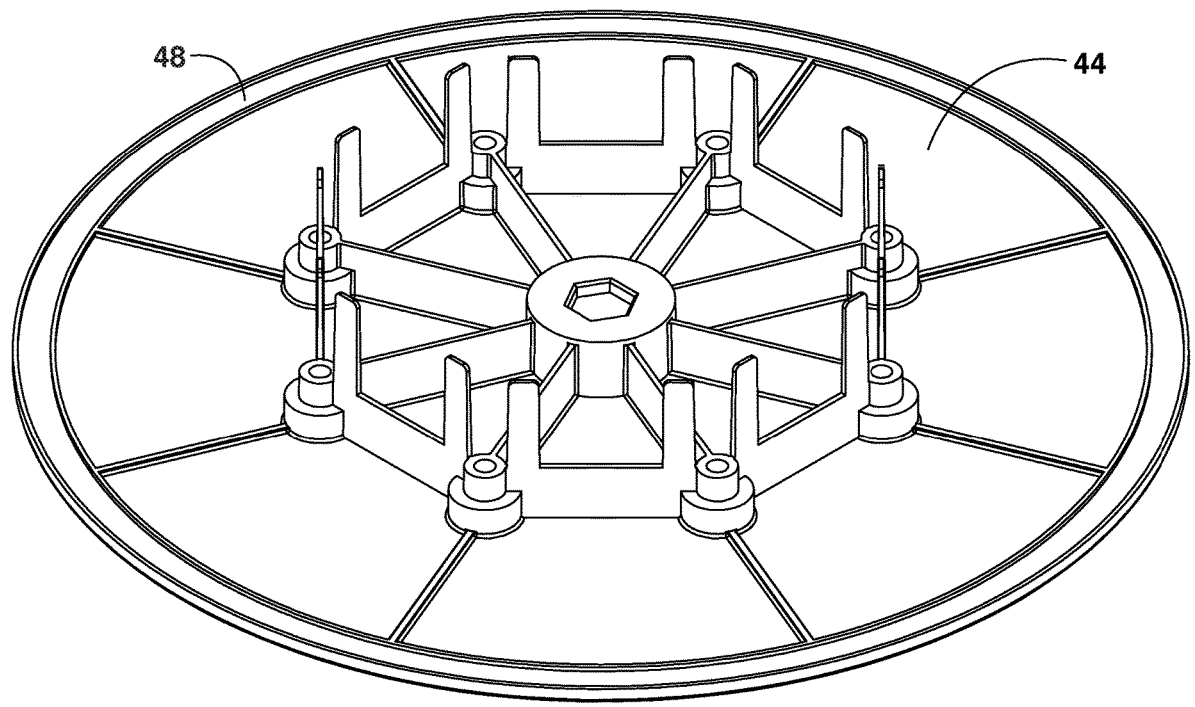
FIG. 24 is a perspective view taken predominately from the inside of a right plate.
Figure 25:
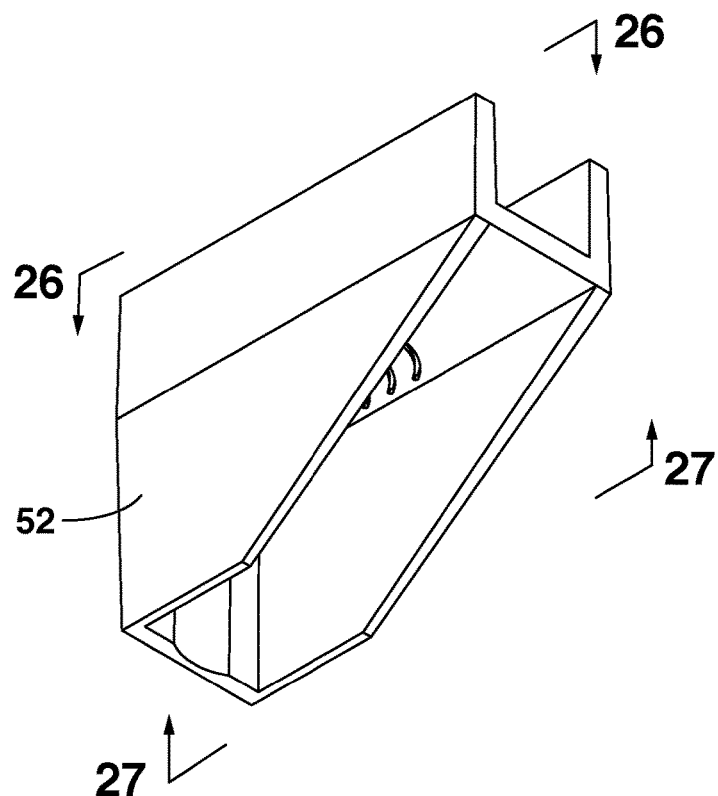
FIG. 25 is a perspective view of a centering slide.
Figure 26:
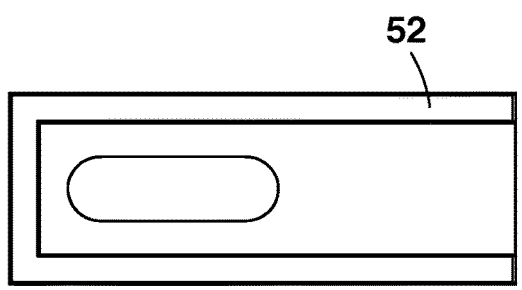
FIG. 26 is a top plan view taken from FIG. 25.
Figure 27:
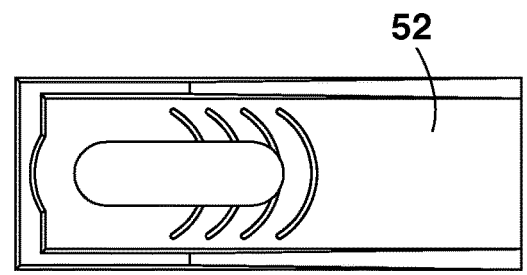
FIG. 27 is a bottom plan view taken from FIG. 25.
Figure 28:
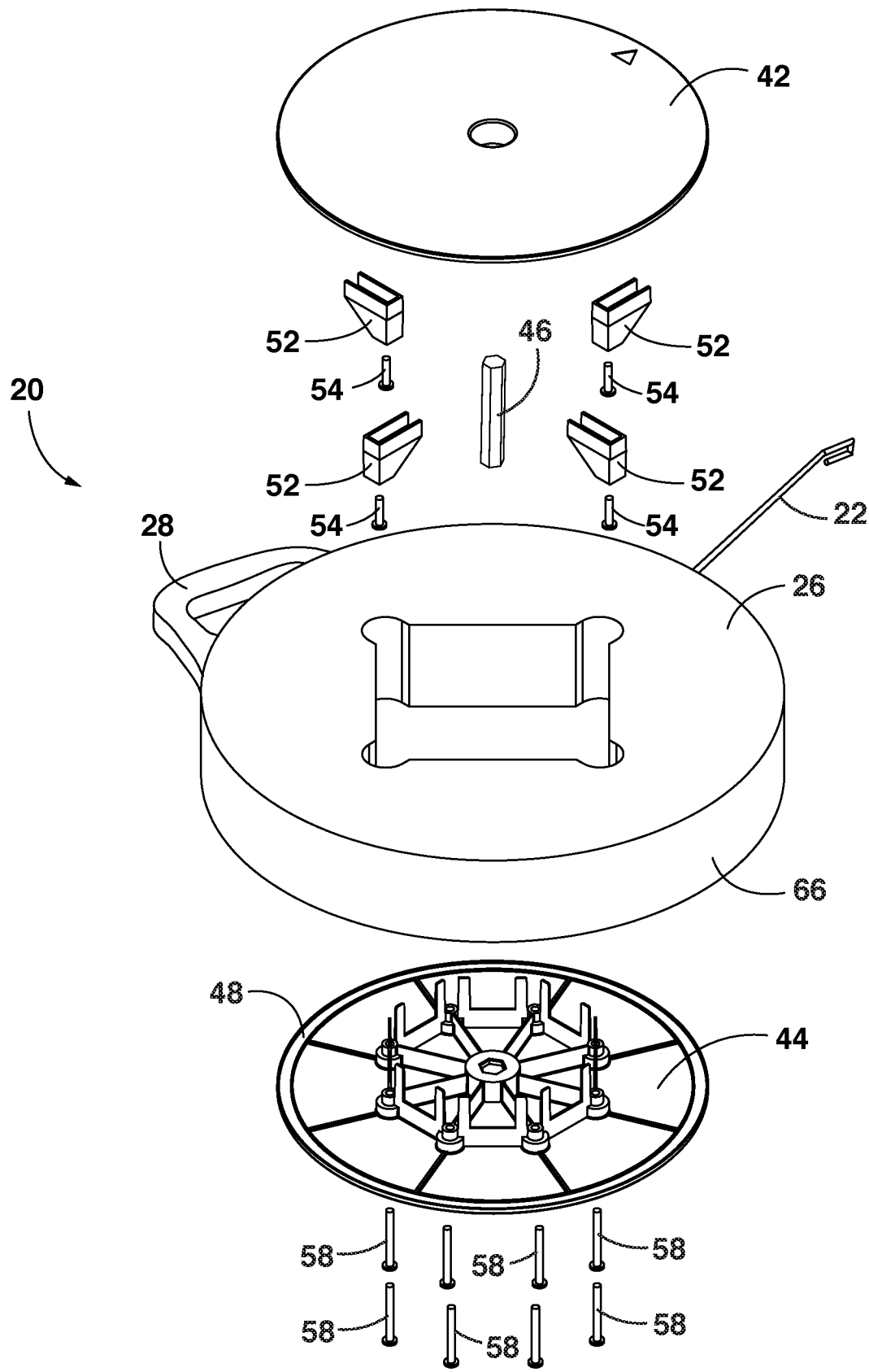
FIG. 28 is a exploded view of a fourth embodiment of a device to automate or semiautomate a fish tape.
Figure 29:
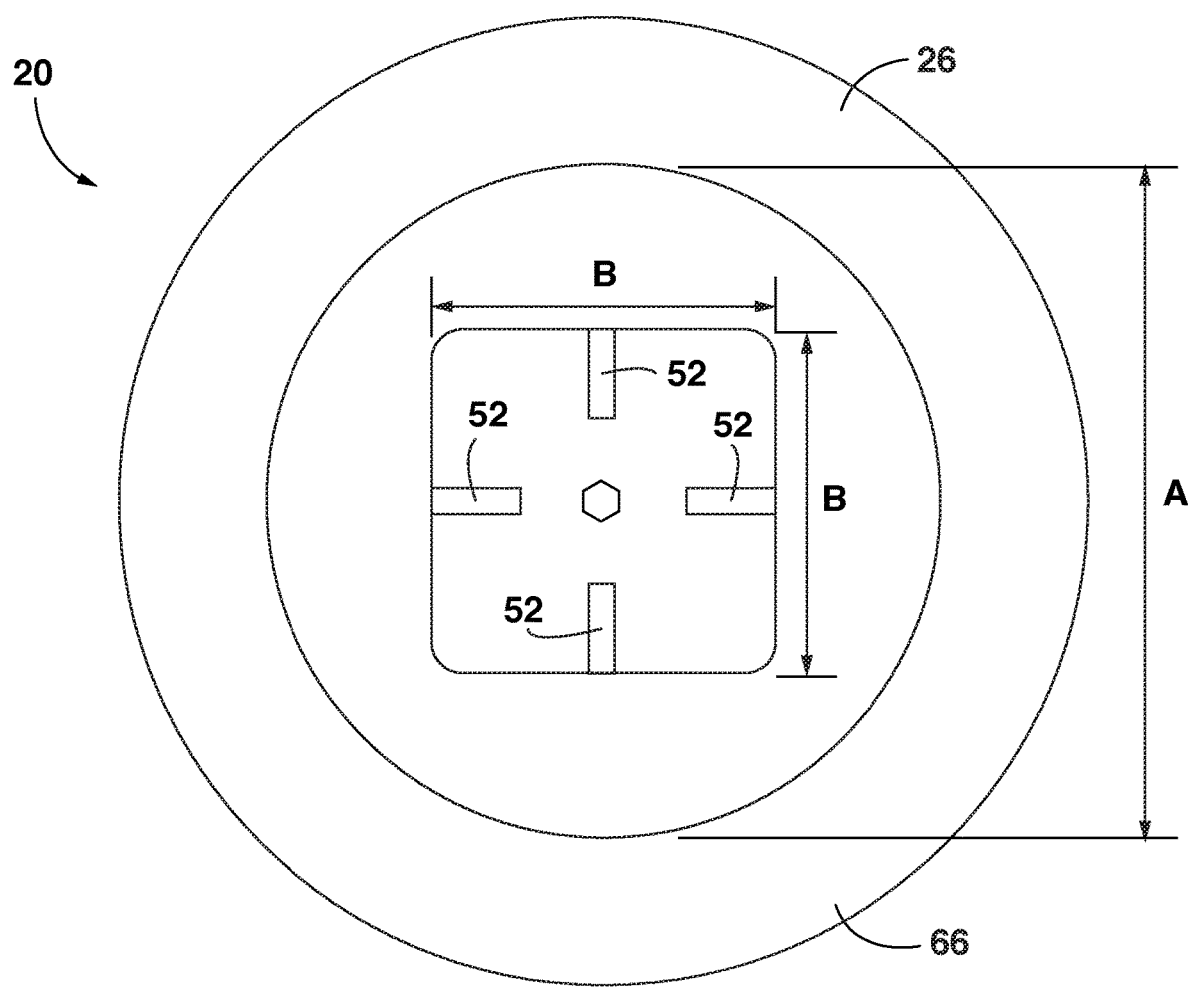
FIG. 29 is a schematic diagram of a side view of a device to automate or semiautomate a fish tape.
Figure 30:
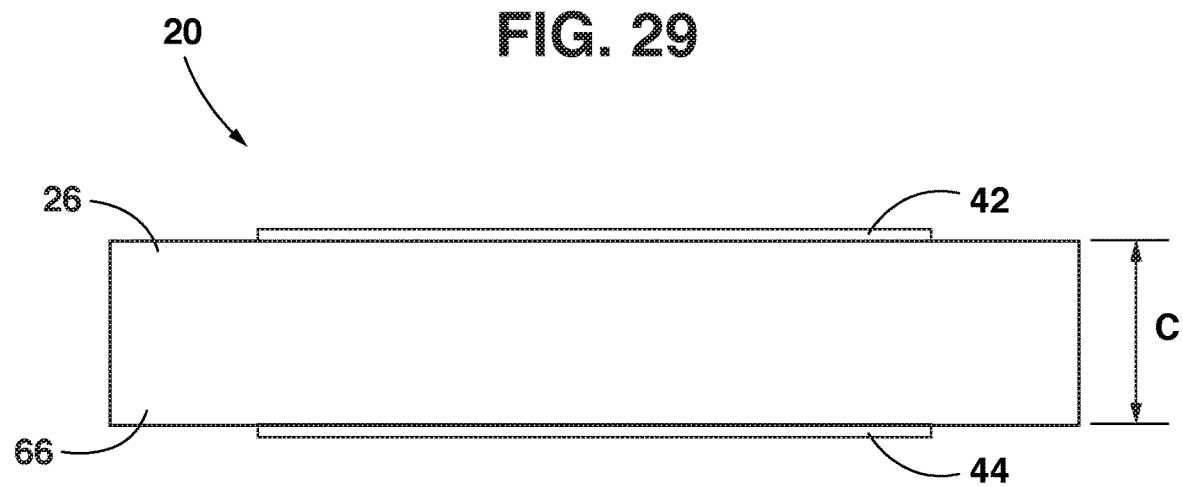
FIG. 30 is a schematic diagram of a plan view of a device to automate or semiautomate a fish tape.
Figure 31:
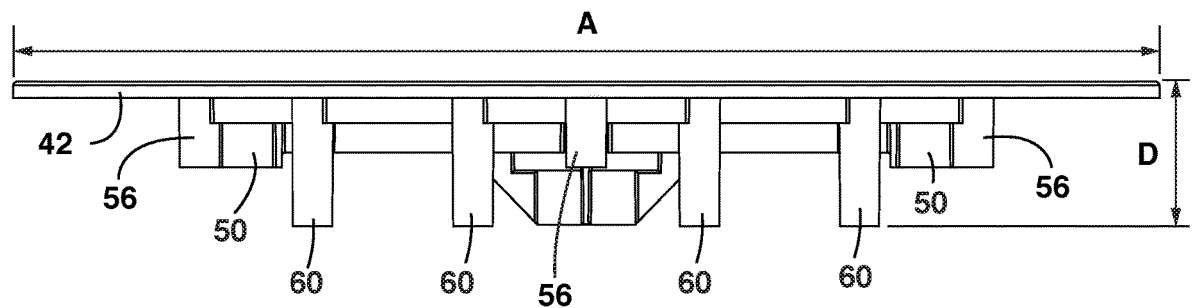
FIG. 31 is a side view of a left plate viewed from the direction as annotated on FIG. 17.
Figure 32:
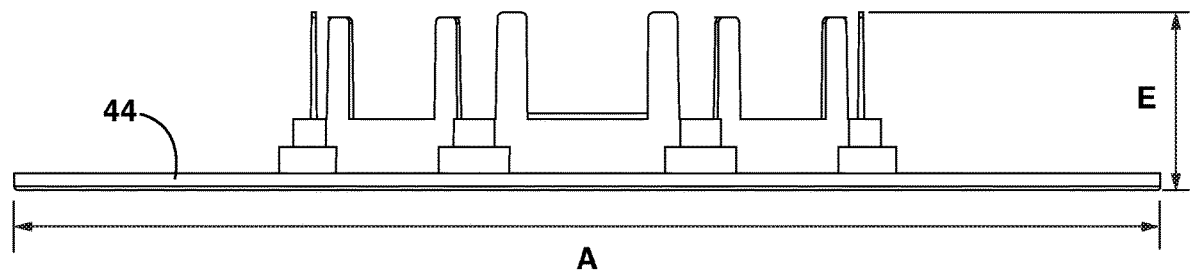
FIG. 32 is a side view of a right plate viewed from the direction as annotated on FIG. 17.

Referring to FIG. 2 a perspective view of typical manual fish tapes available in today's market. A conventional fish tape 36 is typically comprised of a case 66 that has an opening 64. The fish tape 22 is wound about a spool 26 which also serves as a case 66 and is held by an operator with a handle 28.

Referring to FIG. 3 through FIG. 9 a second embodiment of a device to automate or semiautomate a fish tape 20 is disclosed which may be used with an automatic power means 38 or by a hand crank 40. In this embodiment an about 10 inch diameter left plate 42 and right plate 44 are placed at opposite sides of a case 66 about a member 46 which serves as a fixed engagement means for a automatic power means 38 or a crank 40. The left plate 42 preferably contains four tracks 50 equally spaced at 90 degree angles to one another. Centering slides 52 are movable about tracks 50 and are used to center left plate 42 in relation to opening 64 and fastened or otherwise locked in place by fastener one 54 into fastener two 56. The entire assembly is preferably held together by fasteners three 58 into fasteners four 60. Pressure from this connection is placed upon compression ring 48 bearing against case 66 to integrate the assembly with spool 26 forming a device to automate or semiautomate a fish tape 20. In this regard, the assembly becomes fixed to the case 66 so that turning the assembly with the power means 38 or hand crank 60 causes the case 66 to rotate relative to handle 28.

Referring to FIG. 10 through FIG. 14 a third embodiment of a device to automate or semiautomate a fish tape 20 by an automatic power means 38 or by a crank 40 is described. In this embodiment an about 10 inch diameter left plate 42 and right plate 44 are placed at opposite sides of a case 66 about a member 46 which serves as a fixed engagement means for a automatic power means 38 or a crank 40. In this embodiment centering cross member 62 contains four tracks 50 equally spaced at 90 degree angles to one another. Centering slides 52 are movable about tracks 50 and are used to center centering cross member 62 in relation to opening 64 and fastened in place by fastener one 54 into fastener two 56 that pass-through slots in the tracks 50. The entire assembly is held together by fasteners three 58 into fasteners four 60. Pressure from this connection is placed upon compression ring 48 bearing against case 66 to integrate the assembly with spool 26 forming a device to automate or semiautomate a fish tape 20.

In at least one embodiment automatic power means 38 or crank 40 has a female socket or other means to engage member 46. The socket or other means can contain a mechanism to lock automatic power means 38 or crank 40 to male member 46 for the purpose of keeping a connection that cannot be readily disconnected without operator intervention.

In at least one embodiment automatic power means 38 or crank 40 has a male member or other means to engage member 46 out fitted with a female depression at each end of member 46. The male member or other means can contain a mechanism to lock automatic power means 38 or crank 40 to hex member 46 for the purpose of keeping a connection that can not be readily disconnected without operator intervention.

Referring to FIG. 15 through FIG. 28 a fourth embodiment of a device to automate or semiautomate a fish tape 20 by an automatic power means 38 or by a crank 40 is described. In this embodiment an about 10 inch diameter left plate 42 and right plate 44 are placed at opposite sides of a case 66 about a member 46 which serves as a fixed engagement means for an automatic power means 38 or a crank 40. The left plate 42 contains four tracks 50 equally spaced at 90 degree angles to one another. Slotted centering slides 52 (with pass-through slots therein as shown in FIGS. 21-22 and 26-27) are movable about tracks 50 and are used to center left plate 42 in relation to opening 64 and fastened in place by fastener one 54 into fastener two 56. The entire assembly is held together by fasteners three 58 into fasteners four 60. Pressure from this connection is placed upon compression ring 48 bearing against case 66 to integrate the assembly with spool 26 forming a device to automate or semiautomate a fish tape 20.

Referring to FIG. 29 through FIG. 32 schematic diagrams of a device to automate or semiautomate a fish tape 20. These diagrams represent dimensions and measurement adjustment ranges, accommodating various conventional fish tapes 36, by a device to automate or semiautomate a fish tape 20. Dimension "A" is about 10 inches in diameter. Dimension "B" represents an adjustment range of about 7 inches to 8 inches. Dimension "C" represents an adjustment range of about 1.5 inches to 2.5 inches. Dimension "D" is about 1.25 inches in depth. Dimension "E" is about 1.5 inches in depth.

A variety of materials can be used to construct a device to automate or semiautomate a fish tape 20 such as plastic, metal, composite and other materials. A compression ring 48 can be made out of rubber, plastic, foam or other suitable material capable of creating a friction connection between left plate 42, right plate 44 and case 66. The components of a device to automate or semiautomate a fish tape 20 can be manufactured by machining, injection molding, 3D printing or any other means well known in the arts to produce a tool for construction related purposes. Measurements to manufacture a device to automate or semiautomate a fish tape 20 can vary as much as plus or minus twenty five percent of the above stated dimensions in other embodiments.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A device for automating operation of a fish tape assembly having a case movable relative to a handle thereof for extracting a tape located within the case of the fish tape assembly, the case having a surface defining a central opening in the case, the device comprising:
   a left plate;
   a right plate, the left and right plates attachable to each other with the case placed there between on opposite sides of the case, at least one of the left and right plates comprising a member fixed thereto configured to be coupled to a power means or a hand crank;
   a plurality of tracks attached to an inside surface of at least one of the left and right plates; and
   a plurality of centering slides each having distal surfaces, the plurality of centering slides slidingly adjustable relative to the plurality of tracks, wherein the plurality of centering slides are movable radially relative to at least one of the left and right plates between a plurality of position, comprising at least a first position wherein the centering slides are moved distally such that the distal surfaces of each of the plurality of centering slides contact the surface defining the central opening in the case for affixing the device to the fish tape assembly.

2. The device of claim 1, the plurality of tracks and the plurality of centering slides operable to center the device in the central opening in the case of the fish tape assembly.

3. The device of claim 1, wherein the plurality of tracks comprise at least four tracks and the plurality of centering slides comprise at least four centering slides, each of the centering slides adjustable on one of the tracks.

4. The device of claim 3, the tracks and the centering slides spaced from each other at an about 90 degree angle.

5. The device of claim 1, wherein the left and right plates fix the device to the case of the fish tape assembly.

6. The device of claim 5, wherein rotating the device with the member causes the case of the fish tape assembly to rotate relative to the handle of the fish tape assembly.

7. The device of claim 1, comprising a motor operable to rotate the device relative to the handle of the fish tape assembly.

8. The device of claim 7, wherein the motor variably operable for adjusting the speed thereof.

9. The device of claim 1, wherein each of the plurality of tracks comprises a cylindrical structure extending inwardly from at least one of the left and right plates, and wherein the each of the plurality of centering slides has a plurality of walls forming a pocket therein that receives the cylindrical structure of one of the plurality of tracks.

10. The device of claim 9, wherein each of the plurality of centering slides has a pass-through slot that receives a fastener therethrough for fastening one of the plurality of centering slides to one of the plurality of tracks.

* * * * *